(12) United States Patent
Shimizu

(10) Patent No.: US 11,929,921 B2
(45) Date of Patent: Mar. 12, 2024

(54) COMMUNICATION CONTROL APPARATUS, COMMUNICATION CONTROL SYSTEM, AND COMMUNICATION CONTROL METHOD

(71) Applicant: FUJITSU LIMITED, Kawasaki (JP)

(72) Inventor: Takashi Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 157 days.

(21) Appl. No.: 17/678,078

(22) Filed: Feb. 23, 2022

(65) Prior Publication Data
US 2022/0393973 A1    Dec. 8, 2022

(30) Foreign Application Priority Data

Jun. 8, 2021 (JP) ................................. 2021-095635

(51) Int. Cl.
*H04L 45/00* (2022.01)
*H04L 45/64* (2022.01)
*H04L 47/50* (2022.01)

(52) U.S. Cl.
CPC .............. *H04L 45/38* (2013.01); *H04L 45/64* (2013.01); *H04L 47/50* (2013.01)

(58) Field of Classification Search
CPC ................................ H04L 45/38; H04L 45/64
See application file for complete search history.

(56) References Cited

U.S. PATENT DOCUMENTS

| | | |
|---|---|---|
| 2015/0085666 A1 | 3/2015 | Takajo et al. |
| 2015/0281131 A1 | 10/2015 | Bhat et al. |
| 2019/0140983 A1 | 5/2019 | Tu et al. |
| 2019/0173789 A1 | 6/2019 | Shalev et al. |
| 2021/0144091 A1* | 5/2021 | C H .................... H04L 41/40 |
| 2022/0045940 A1* | 2/2022 | Subrahmanya ....... G06F 16/907 |
| 2022/0166718 A1* | 5/2022 | Kamisetty ............... H04L 49/90 |

FOREIGN PATENT DOCUMENTS

| | | |
|---|---|---|
| EP | 3461084 A1 | 3/2019 |
| JP | 2018-511272 A | 4/2018 |
| WO | 2013/146770 A1 | 10/2013 |
| WO | 2016/162804 A1 | 10/2016 |

OTHER PUBLICATIONS

Extended European Search Report dated Jul. 25, 2022 for corresponding European Patent Application No. 22159662.0, 13 pages.

* cited by examiner

*Primary Examiner* — Donald L Mills
(74) *Attorney, Agent, or Firm* — Fujitsu Intellectual Property Center

(57) ABSTRACT

A communication control apparatus that implements at least some functions in flow control of a software defined network (SDN) by hardware, the communication control apparatus includes a processor. The configured to set, when a packet of a flow that is not registered in transfer control information is detected when a plurality of packets that constitutes a flow is transferred, a destination resolution standby state for the flow in the transfer control information, store, into an evacuation queue, at least some of packets received in the destination resolution standby state, stop a pipeline that processes a packet to be transferred after destination resolution for the flow, output a packet that belongs to the flow and is stored in the evacuation queue, and operate the pipeline after the output of the packet stored in the evacuation queue is completed.

12 Claims, 27 Drawing Sheets

COMMUNICATION CONTROL APPARATUS, COMMUNICATION CONTROL SYSTEM, AND COMMUNICATION CONTROL METHOD

CROSS-REFERENCE TO RELATED APPLICATION

This application is based upon and claims the benefit of priority of the prior Japanese Patent Application No. 2021-95635, filed on Jun. 8, 2021, the entire contents of which are incorporated herein by reference.

FIELD

The embodiments discussed herein are related to a communication control apparatus, a communication control system, and a communication control method.

BACKGROUND

A virtual router that implements a function as a router in a network by software has been known. Just as a router connects between servers and resolves a destination of a packet, the virtual router connects between virtual machines (VMs) and resolves a destination. The virtual router generally searches a large number of tables and resolves the destination.

The virtual router is implemented by a software defined network (SDN), and includes a control plane and a data plane. The control plane manages a flow, and for example, sets a combination of an Internet protocol (IP) address, a port number, and a destination as a flow.

The data plane transfers a packet, analyzes content of an input packet, and performs hash calculation same as the control plane to access a corresponding entry and specify the destination.

In the data plane, a flow table is referred to based on an IP address and a port number of a transmission destination of the input packet to determine a transfer destination of the packet.

In the flow table, a combination of IP addresses and port numbers of a transmission source and a reception destination is registered as an entry. However, the entry is not registered when a new service is started. Thus, the control plane resolves (performs destination resolution) whether a packet may be transferred or an address needs to be changed, or the like, and registers an entry in the flow table. Registering the entry in the flow table in this way may also be called flow learning. Furthermore, a state where no entry is registered when the flow table is referred to in the data plane may also be called a flow miss.

In the virtual router, the data plane implemented by software occupies a large amount of resources of a central processing unit (CPU). Thus, in recent years, some functions of the data plane have been offloaded to hardware such as a field programmable gate array (FPGA). Offloading some functions implemented by software to hardware may also be called hardware offload (hard offload).

FIG. 26 is a diagram exemplarily illustrating a configuration of a known virtual router.

In FIG. 26, each function indicated in a data plane is offloaded (hard offloaded) to an FPGA.

In the virtual router, a packet that is not registered in a flow table is transmitted to a control plane (see a reference sign A1 in FIG. 26), and reintroduced to the data plane (see a reference sign A2 in FIG. 26) after the control plane resolves a destination and an action.

Here, when a large number of flow misses occur at the same time, it is difficult to buffer all packets. Thus, in many cases, packets for which these flow misses occur are not buffered and are reintroduced into a pipeline.

The reintroduced packets are output to a crossbar switch (Xbar SW) via a reintroduction pipeline (see a reference sign A3), which is a route different from a normal pipeline, to prevent a reregistration check.

International Publication Pamphlet No. WO 2013/146770 and Japanese National Publication of International Patent Application No. 2018-511272 are disclosed as related art.

SUMMARY

According to an aspect of the embodiments, a communication control apparatus that implements at least some functions in flow control of a software defined network (SDN) by hardware, the communication control apparatus includes a memory; and a processor coupled to the memory and configured to: set, when a packet of a flow that is not registered in transfer control information is detected when a plurality of packets that constitutes a flow is transferred, a destination resolution standby state for the flow in the transfer control information; store, into an evaluation queue, at least some of packets received in the destination resolution standby state; stop a pipeline that processes a packet to be transferred after destination resolution for the flow; output a packet that belongs to the flow and is stored in the evacuation queue; and operate the pipeline after the output of the packet stored in the evacuation queue is completed.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In such a hard offloaded known virtual router, there is a problem that there are many architectures in which packets are reintroduced, and it is difficult to perform packet order control.

Figure 27:
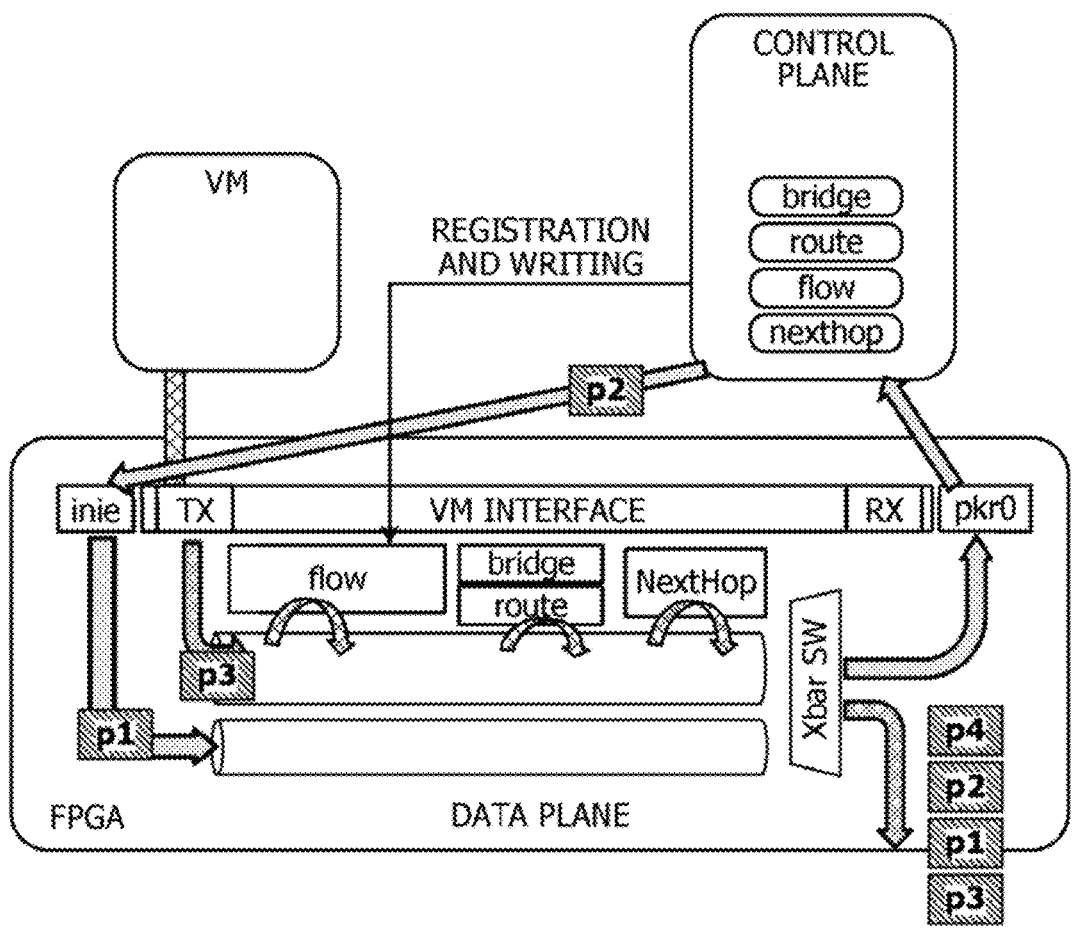
FIG. 27 is a diagram illustrating an example of packet transfer in the hard offloaded known virtual router.

FIG. 27 is a diagram illustrating an example of packet transfer in the hard offloaded known virtual router.

In FIG. 27, four packets belonging to the same flow are indicated by denoting reference signs p1 to p4. These packets p1 to p4 are input in order of p1, p2, p3, and p4 and should be sent out in this order.

It is assumed that the packet p2 is transferred to the control plane without registration and writing of the flow to the flow table being performed in time. Furthermore, for the packet p3, it is assumed that registration and writing of the flow to the flow table by the control plane is performed in time. With this configuration, the packet p3 is output before the packets p1 and p2. For example, the four packets input to the virtual router in the order of p1, p2, p3, and p4 are output in order of the packets p3, p1, p2, and p4.

Although an order relationship between the packet p1 and the packet p2 and an order relationship between the packet p3 and the packet p4 are maintained, an order relationship between the packet p1 and the packet p3 and an order relationship between the packet p2 and the packet p3 are switched.

Here, as illustrated in FIG. 27, when the packets input in the order of p1, p2, p3, and p4 are transferred in the order of the packets p3, p1, p2, and p4, the packet p3 is retransmitted in communication such as a transmission control protocol (TCP). This slows down an overall processing speed and a service is degraded.

In one aspect, it is an object of an embodiment to implement packet order control in a communication control apparatus that implements at least some functions in flow control of a software defined network (SDN) by hardware.

Hereinafter, embodiments relating to the present communication control apparatus, communication control system, and communication control method will be described with reference to the drawings. Note that the embodiments to be described below are merely examples, and there is no intention to exclude application of various modifications and technologies not explicitly described in the embodiments. For example, the present embodiments may be variously modified and implemented without departing from the spirit thereof. Furthermore, each drawing is not intended to include only components illustrated in the drawing and may include another function and the like.

(I) Description of First Embodiment (A) Structure

Figure 1:
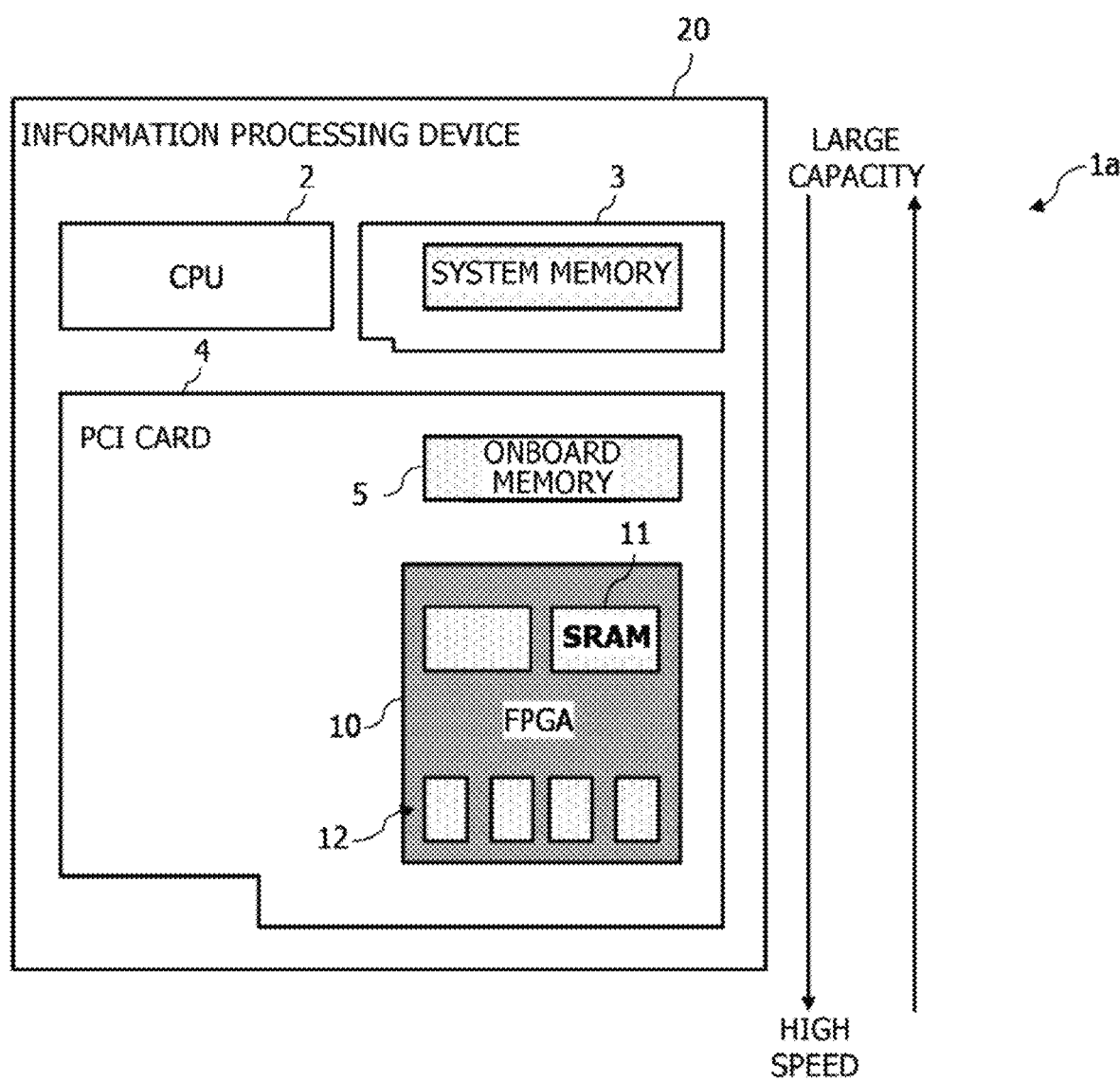
FIG. 1 is a diagram exemplarily illustrating a hardware structure of an information processing device that implements a function of a virtual router as an example of a first embodiment.

FIG. 1 is a diagram exemplarily illustrating a hardware structure of an information processing device 20 that implements a function of a virtual router 1a as an example of a first embodiment.

The information processing device 20 may also be, for example, a computer having a server function. The information processing device 20 implements a function as the virtual router 1a.

The virtual router 1a transmits/receives (transfers) packets between virtual machines 300 (see FIG. 2) and between a virtual machine 300 and another device (not illustrated). The virtual machine may be represented as a VM.

The virtual machine 300 is, for example, a virtual computer created on an application program such as a hypervisor. The virtual machine 300 executes various types of processing similarly to a computer implemented by physical hardware. For example, the virtual machine 300 executes various OSs (guest OSs) and application programs running on this guest OSs. The OS is an abbreviation for an operating system. Note that, the virtual machine 300 may be implemented by a known method, and the description thereof will be omitted. Furthermore, instead of the virtual machine 300, another virtualization platform technology such as a container may also be used, and may be appropriately changed and implemented.

The virtual machine 300 includes a virtual port (not illustrated), and transmits/receives packets via this virtual port. The virtual port is specified by a port number.

As illustrated in FIG. 1, the information processing device 20 includes a central processing unit (CPU) 2, a system memory 3, and a peripheral component interconnect (PCI) card 4.

The CPU 2 is a processing device that performs various types of control and calculation, and implements various functions by executing an OS and programs stored in the system memory 3. For example, the CPU 2 implements the function as the virtual router.

The system memory 3 is a storage memory including a read only memory (ROM) and a random access memory (RAM). In the ROM of the system memory 3, a software program relating to virtual router control and data or the like for the program are written. The software program on the system memory 3 is appropriately read and executed by the CPU 2. Furthermore, the RAM of the system memory 3 is used as a primary storage memory or a working memory.

Furthermore, the information processing device 20 may also include a storage device (not illustrated). The storage device is a storage device such as a hard disk drive (HDD), a solid state drive (SSD), or a storage class memory (SCM), and stores various types of data.

The PCI card 4 is an expansion card that expands the function of the information processing device 20, and is attached to, for example, a main board (motherboard) (not illustrated) of the information processing device 20. The PCI card 4 communicates with the main board of the information processing device 20 via a PCI bus.

As illustrated in FIG. 1, the PCI card 4 includes an onboard memory 5 and a field programmable gate array (FPGA) 10. The onboard memory 5 stores a program (configuration data) to be a base of a logic circuit in the FPGA 10.

The FPGA 10 is a device capable of electrically changing a circuit design of a digital circuit. The FPGA 10 is a large scale integration circuit (LSI) having a large number of logical gates. The FPGA 10 functions as a predetermined logic circuit by writing configuration data describing a logical relationship and a connection relationship between logical gates, to a configuration RAM (not illustrated) included in the FPGA 10.

The FPGA 10 includes a static random access memory (SRAM) 11 and a plurality of registers 12, and when the FPGA 10 is powered on, a program file (bitstream data) is loaded from the onboard memory 5 and loaded into the SRAM 11 in the FPGA 10.

Each bit of the bitstream data loaded in the SRAM 11 becomes an information source of a user circuit implemented on the FPGA 10, and a resource provided in the FPGA 10 is customized to implement a predetermined circuit. In this information processing device 20, the FPGA 10 implements at least some functions of a data plane in the virtual router 1*a*.

The register 12 may also temporarily store various types of data or the like generated when the FPGA 10 functions as the data plane.

Figure 2:
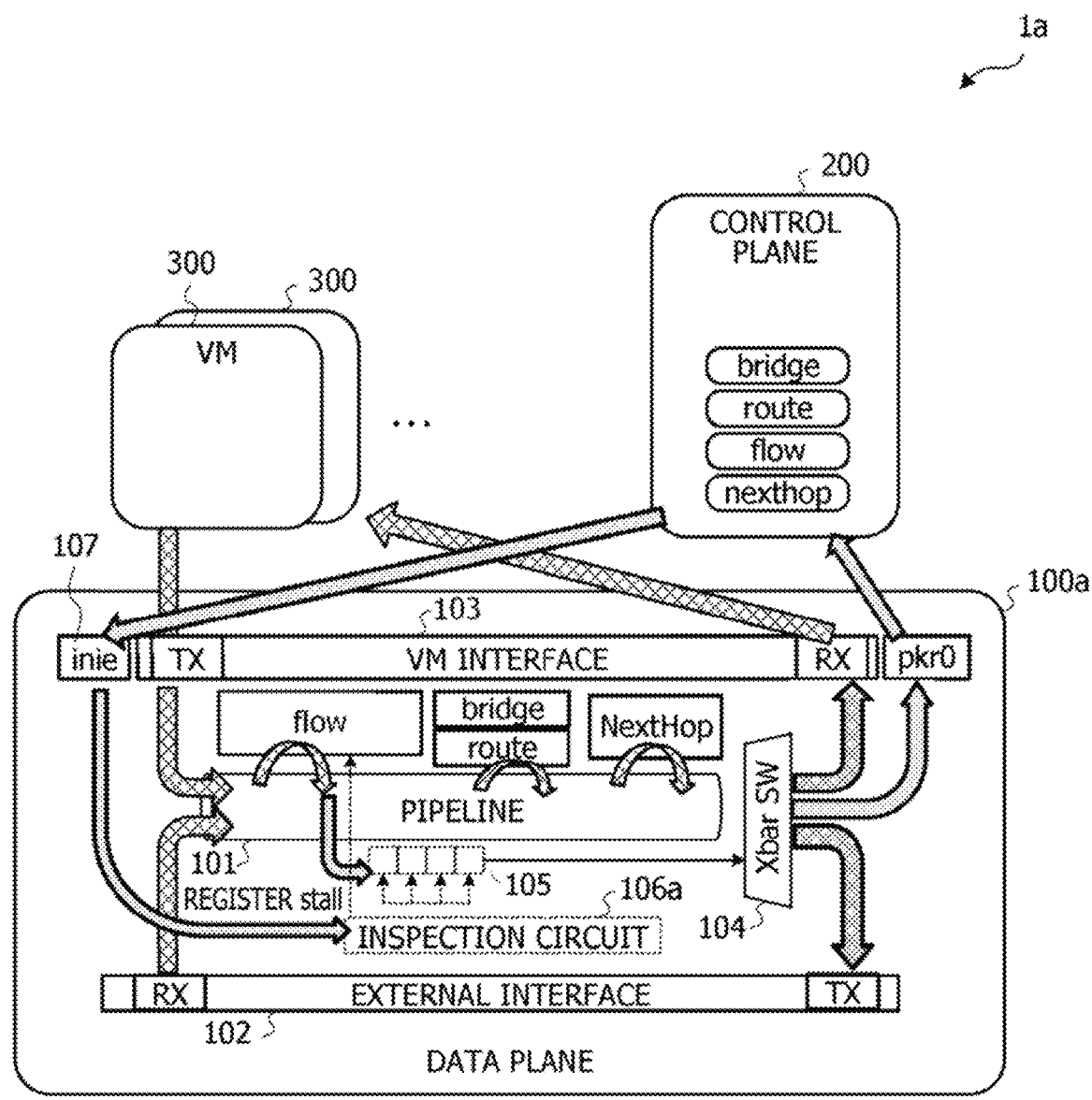
FIG. 2 is a diagram illustrating a functional structure of the virtual router as an example of the first embodiment.

FIG. 2 is a diagram illustrating a functional structure of the virtual router 1*a* as an example of the first embodiment.

The virtual router 1*a* exemplarily illustrated in FIG. 2 includes a control plane 200 and a data plane 100*a*. FIG. 2 illustrates an example in which the virtual router 1*a* transfers a packet input from the virtual machine 300.

The control plane 200 determines an action for a flow not registered in a flow table of the data plane 100*a* described later. When a packet belonging to a flow not registered in the flow table is transferred from a pipeline 101 of the data plane 100*a*, the control plane 200 determines an action to be performed for the flow to which the corresponding packet belongs. In the data plane 100*a*, a state where a flow is not registered in the flow table may also be called a flow miss.

The content of the action determined by the control plane 200 may also include flow, bridge, route, and NextHop, and may also further include security policies such as block service and Adder change.

The control plane 200 may also analyze destination information on the basis of, for example, a border gateway protocol (BGP), which is a route control protocol.

Furthermore, the control plane 200 adds, to a packet for which a flow miss occurs, the action determined for the flow to which the corresponding packet belongs as forward information, and causes the packet to which the corresponding forward information is added to be input to a reintroduction port 107 of the data plane 100*a*.

In the virtual router 1*a*, a flow of each packet may be specified by using a hash value calculated on the basis of a 5-tuple of a packet (transmission source IP, transmission source port number, destination IP, destination port number, and protocol number).

Hereinafter, the hash value calculated on the basis of the 5-tuple of a packet may be simply referred to as a hash value of a packet. Furthermore, for example, comparing hash values of packets to determine whether flows are matched or not, or the like may be simply referred to as comparing packets.

The control plane 200 may also be included in the information processing device 20. Furthermore, the information processing device 20 may also constitute an information processing system (communication control system) connected to another information processing device via a network, and the control plane 200 may also be included in another information processing device connected to this information processing device 20.

As illustrated in FIG. 2, the data plane 100*a* of the virtual router 1*a* includes the pipeline 101, an external interface 102, a VM interface 103, a crossbar switch (Xbar SW) 104, an evacuation buffer unit 105, an inspection circuit 106*a*, and the reintroduction port 107.

To the reintroduction port 107, a packet reintroduced from the control plane 200 is input. The packet input to the reintroduction port 107 may also be called a reintroduction packet. Furthermore, the reintroduction port 107 may also be called an injection port (inje) 107.

The packet input to the reintroduction port 107 is transferred (input) to the inspection circuit 106*a* described later.

To the pipeline 101, a packet to be transferred is input. A plurality of management tables and the like are referred to for packets on the pipeline 101, and a destination search and the like are performed. In the management table, flow, bridge, route, NextHop, and the like are managed. Furthermore, for example, a management table that manages a flow may also be called a flow table. The flow table functions as transfer control information used for transferring a plurality of packets constituting a flow.

The packet input to the pipeline 101 may also be output to the crossbar switch 104 in a First In, First Out (FIFO) manner.

Furthermore, the pipeline 101 transfers a packet for which a flow is not registered in the flow table to the evacuation buffer unit 105 described later.

Moreover, when detecting a packet of a flow that is not registered (flow miss) in the flow table (transfer control information) when a plurality of packets constituting the flow is transferred, the pipeline 101 functions as a setting unit that sets hold (destination resolution standby state) for the corresponding flow in the flow table.

The external interface 102 transmits/receives packets to/from an external device (not illustrated). A packet sent out to the external device is transmitted via this external interface 102. Furthermore, a packet input from the external device is received by this external interface 102 and input to the pipeline 101.

The VM interface 103 transmits/receives packets to/from the virtual machine 300. A packets sent out to the virtual machine 300 is transmitted via this VM interface 103. Furthermore, a packet input from the virtual machine 300 is received by this VM interface 103 and input to the pipeline 101.

The crossbar switch 104 switches a sending destination of a packet output from each of the pipeline 101 and the evacuation buffer unit 105, according to each destination. The crossbar switch 104 inputs, for example, a packet transmitted to an external device to the external interface 102. Furthermore, the crossbar switch 104 inputs a packet transmitted to the virtual machine 300 to the VM interface 103.

Furthermore, the crossbar switch 104 inputs, to the control plane 200, a packet which is input to the pipeline 101 and for which a flow is not registered in the flow table. In the example illustrated in FIG. 2, a port used for sending out a packet to the control plane 200 is indicated by denoting a reference sign pkt0.

To the evacuation buffer unit 105, a packet for which a flow is not registered in the flow table is input. A plurality of packets belonging to a plurality of types of flows is input to the evacuation buffer unit 105, and the evacuation buffer unit 105 may select and output only a packet belonging to a specific flow from among these plurality of packets belonging to the plurality of types of flows.

Furthermore, a plurality of packets belonging to the same flow input to the evacuation buffer unit 105 is output in a state where the order is maintained.

The evacuation buffer unit 105 functions as an evacuation queue that stores at least some of packets received in a hold (destination resolution standby) state.

Note that, a detailed configuration of the evacuation buffer unit 105 will be described later with reference to FIG. 4.

The inspection circuit 106a controls a packet output from each of the pipeline 101 and the evacuation buffer unit 105.

To the inspection circuit 106a, a packet introduced to the reintroduction port 107 by the control plane 200 is input.

When a packet is input from the reintroduction port 107, the inspection circuit 106a registers (sets) stall for a flow of the corresponding packet in the flow table.

Figure 3:
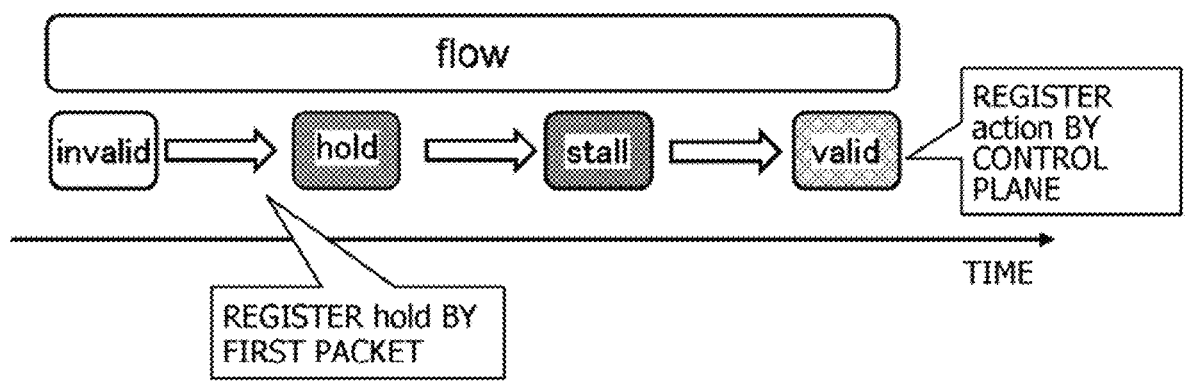
FIG. 3 is a diagram illustrating a transition of management information in a flow table in the virtual router as an example of the first embodiment.

FIG. 3 is a diagram illustrating a transition of management information in the flow table in the virtual router 1a as an example of the first embodiment.

In this virtual router 1a, the management information of each flow in the flow table transitions in order of invalid, hold, stall, and valid as illustrated in FIG. 3.

Here, invalid indicates that the corresponding flow is not registered (invalid) in the flow table. The pipeline 101 stores, in the evacuation buffer unit 105, a packet belonging to the flow for which invalid is set in the flow table.

valid indicates that the corresponding flow is registered (valid) in the flow table. The pipeline 101 processes a packet belonging to the flow for which valid is set in the flow table according to an action set for the corresponding flow in the flow table, and inputs the packet to the crossbar switch 104.

hold indicates that the corresponding flow is not registered in the flow table and a state where an action of the corresponding flow is waiting to be registered in the flow table by the control plane 200. For example, hold indicates a destination resolution standby state by the control plane 200 of the corresponding flow. The pipeline 101 stores, in the evacuation buffer unit 105, a packet belonging to the flow for which hold is set in the flow table.

When a flow miss is detected in the pipeline 101, hold is set for the flow to which the corresponding packet belongs in the flow table.

stall indicates a state where an action of the corresponding flow is registered in the flow table by the control plane 200, and a packet of the corresponding flow is reintroduced to the reintroduction port 107. The pipeline 101 stops the corresponding pipeline 101 when a packet belonging to the flow for which stall is set in the flow table is input. stall functions as control information that stops the pipeline 101.

Figure 4:
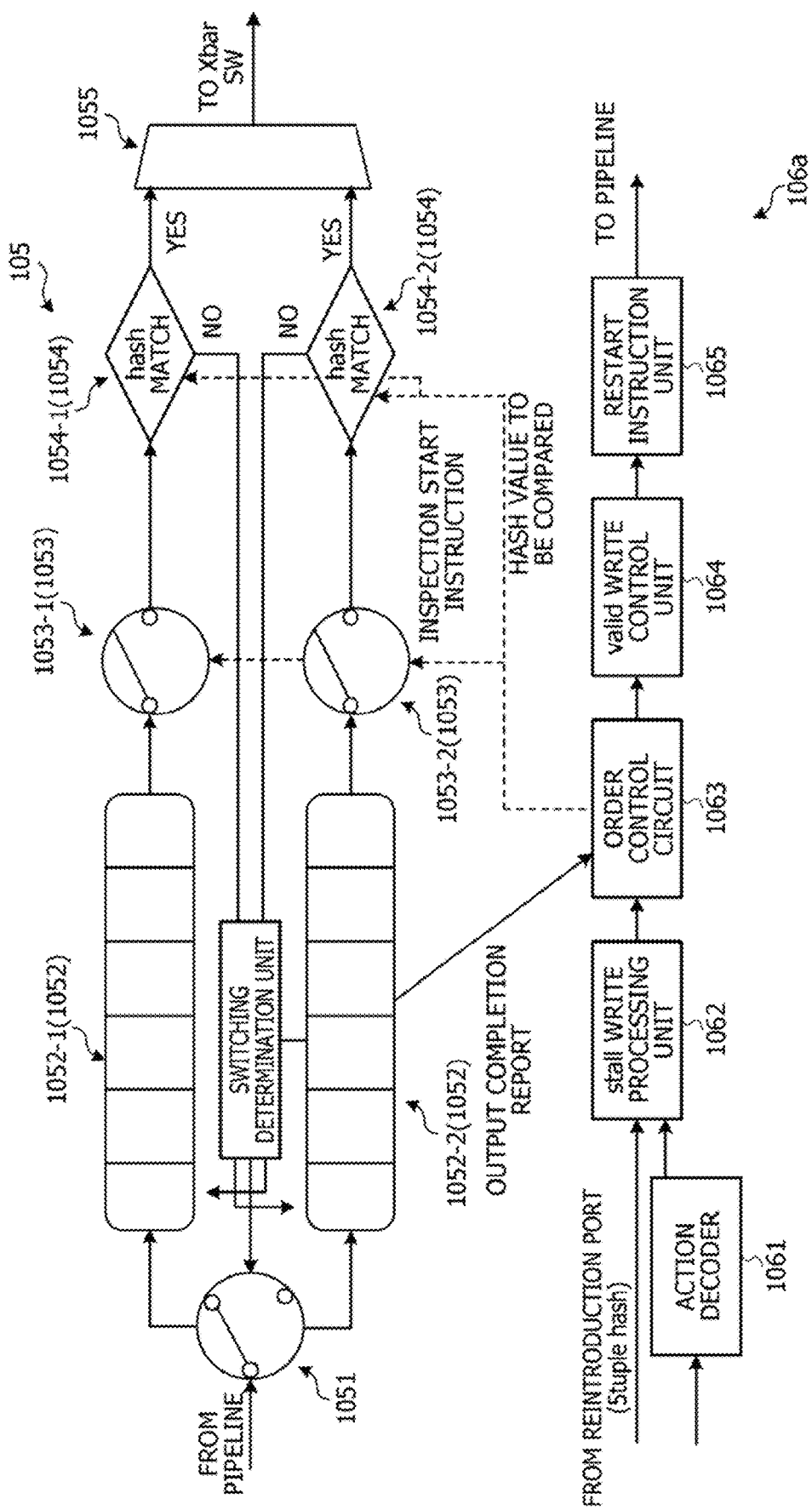
FIG. 4 is a diagram exemplarily illustrating a structure of an evacuation buffer unit and an inspection circuit in the virtual router as an example of the first embodiment.

FIG. 4 is a diagram exemplarily illustrating a structure of the evacuation buffer unit 105 and the inspection circuit 106a in the virtual router 1a as an example of the first embodiment.

As illustrated in FIG. 4, the evacuation buffer unit 105 includes an input changeover switch 1051, FIFO buffers 1052-1 and 1052-2, output control switches 1053-1 and 1053-2, comparators 1054-1 and 1054-2, an output gate 1055, and a switching determination unit 1056.

The FIFO buffers 1052-1 and 1052-2 are both FIFO buffers, and a packet input from the pipeline 101 is input to either one of the FIFO buffers 1052-1 and 1052-2.

Hereinafter, when the FIFO buffers 1052-1 and 1052-2 are not particularly distinguished, they are referred to as FIFO buffers 1052.

The input changeover switch 1051 inputs (distributes) a packet input from the pipeline 101 to either one of the FIFO buffer 1052-1 and the FIFO buffer 1052-2. For example, the input changeover switch 1051 exercise control of continuously storing packets in either one of the FIFO buffer 1052-1 and the corresponding FIFO buffer 1052-2, and when the FIFO buffer 1052 becomes a buffer-full state, switching to the other to store packets.

The output control switch 1053-1 outputs a packet from the FIFO buffer 1052-1, and inputs the packet to the comparator 1054-1. The output control switch 1053-2 outputs a packet from the FIFO buffer 1052-2, and inputs the packet to the comparator 1054-2. Hereinafter, when the output control switches 1053-1 and 1053-2 are not particularly distinguished, they are referred to as output control switches 1053.

These output control switches 1053 output packets from the FIFO buffers 1052 according to an inspection start instruction from an order control circuit 1063 of the inspection circuit 106a described later.

The comparator 1054-1 compares a hash value of a packet output from the FIFO buffer 1052-1 with a hash value to be compared input from the order control circuit 1063. The hash value to be compared indicates a flow of a packet desired to be output from the evacuation buffer unit 105.

As a result of this comparison, when the hash values match, the comparator 1054-1 outputs the packet output from the FIFO buffer 1052-1 to the crossbar switch 104 via the output gate 1055. Furthermore, as a result of the comparison, when the hash values do not match, the comparator 1054-1 inputs the packet output from the FIFO buffer 1052-1 to the switching determination unit 1056 described later.

The comparator 1054-2 compares a hash value of a packet output from the FIFO buffer 1052-2 with a hash value of a packet to be compared (hash value to be compared) input from the order control circuit 1063.

As a result of this comparison, when the hash values match, the comparator 1054-2 outputs the packet output from the FIFO buffer 1052-2 to the crossbar switch 104 via the output gate 1055. Furthermore, as a result of the comparison, when the hash values do not match, the comparator 1054-2 inputs the packet output from the FIFO buffer 1052-2 to the switching determination unit 1056.

Hereinafter, when the comparators 1054-1 and 1054-2 are not particularly distinguished, they are referred to as comparators 1054.

As a result of the comparison by the comparator 1054, a packet that matches the hash value of the packet to be compared input from the order control circuit 1063 may also called a packet to be output. Furthermore, as a result of the comparison by the comparator 1054, a packet that does not match the hash value of the packet to be compared input from the order control circuit 1063 may also called a packet not to be output.

Only the packet to be output is output from the evacuation buffer unit 105 (FIFO buffer 1052).

In the comparator 1054, the hash value to be compared input from the order control circuit 1063 functions as output packet specification information for specifying a packet to be output from the evacuation buffer unit 105.

When a packet is input from the comparator 1054-1, the switching determination unit 1056 stores the corresponding packet in the FIFO buffer 1052-2. Furthermore, when a packet is input from the comparator 1054-2, the switching determination unit 1056 stores the corresponding packet in the FIFO buffer 1052-1.

With this configuration, in the FIFO buffer 1052 of the evacuation buffer unit 105, a packet not to be output determined as a result of the comparison by the comparator 1054 is stored. Upon re-storing in this FIFO buffer 1052, the packet not to be output stored in one FIFO buffer 1052 of the two (one set of) FIFO buffers 1052 is stored (moved) in the other FIFO buffer 1052.

Furthermore, when all packets belonging to one flow are output from the FIFO buffer 1052, the switching determination unit 1056 notifies the order control circuit 1063 of the inspection circuit 106a of an output completion report.

To the output gate 1055, a packet output from each of the comparators 1054-1 and 1054-2 is input, and these input packets are input to the crossbar switch 104.

As illustrated in FIG. 4, the inspection circuit 106a has functions as an action decoder 1061, a stall write processing unit 1062, the order control circuit 1063, a valid write control unit 1064, and a restart instruction unit 1065.

The action decoder 1061 extracts information regarding an action set by the control plane 200 from a reintroduction packet input from the reintroduction port 107, and performs decoding.

To the stall write processing unit 1062, a reintroduction packet is input from the reintroduction port 107. The stall write processing unit 1062 refers to a flow table on the basis of a hash value of the reintroduction packet, and registers (sets) stall for a flow to which the corresponding packet belongs in the flow table.

As described above, when the packet belonging to the flow for which stall is set is input, the pipeline 101 is stopped. Therefore, the stall write processing unit 1062 functions as a stop processing unit that stops the pipeline 101 that processes a packet to be transferred after destination resolution for the flow.

The order control circuit 1063 inputs an inspection start instruction to each output control switch 1053, and sequentially outputs packets stored in each FIFO buffer 1052 to the comparator 1054.

The order control circuit 1063 inputs a hash value representing a flow to which a packet input from the reintroduction port 107 (packet to be transferred) belongs to each comparator 1054 of the evacuation buffer unit 105. The hash value representing the flow to which the packet to be transferred belongs functions as output packet specification information for specifying a packet to be output from the evacuation buffer unit 105.

Furthermore, an output completion report indicating that all packets belonging to one flow are output from the FIFO buffer 1052 is input to the order control circuit 1063 from the switching determination unit 1056 of the evacuation buffer unit 105. When the output completion report is input from the switching determination unit 1056, the order control circuit 1063 inputs a notification that the output of the flow to be processed is completed to the valid write control unit 1064.

When receiving an input of a notification that an output of a flow to be processed is completed from the order control circuit 1063, the valid write control unit 1064 registers (sets) valid for the corresponding flow to be processed in the flow table. The valid write control unit 1064 may also input the notification that the output of the flow to be processed is completed to the restart instruction unit 1065.

When valid is set for a flow in the flow table, the restart instruction unit 1065 causes the pipeline 101 to restart. With this configuration, a packet held on the pipeline 101 is output. When a notification that an output of a flow to be processed is completed is input from the valid write control unit 1064, the pipeline 101 may also be caused to restart.

The restart instruction unit 1065 functions as an operation control unit that operates the pipeline 101 after the output of the packet stored in the evacuation buffer unit 105 (evacuation queue) is completed.

(B) Operation

Processing in the virtual router 1a as an example of the first embodiment configured as described above will be described with reference to FIGS. 7 to 12 according to timing charts illustrated in FIGS. 5 and 6.

Figure 7:
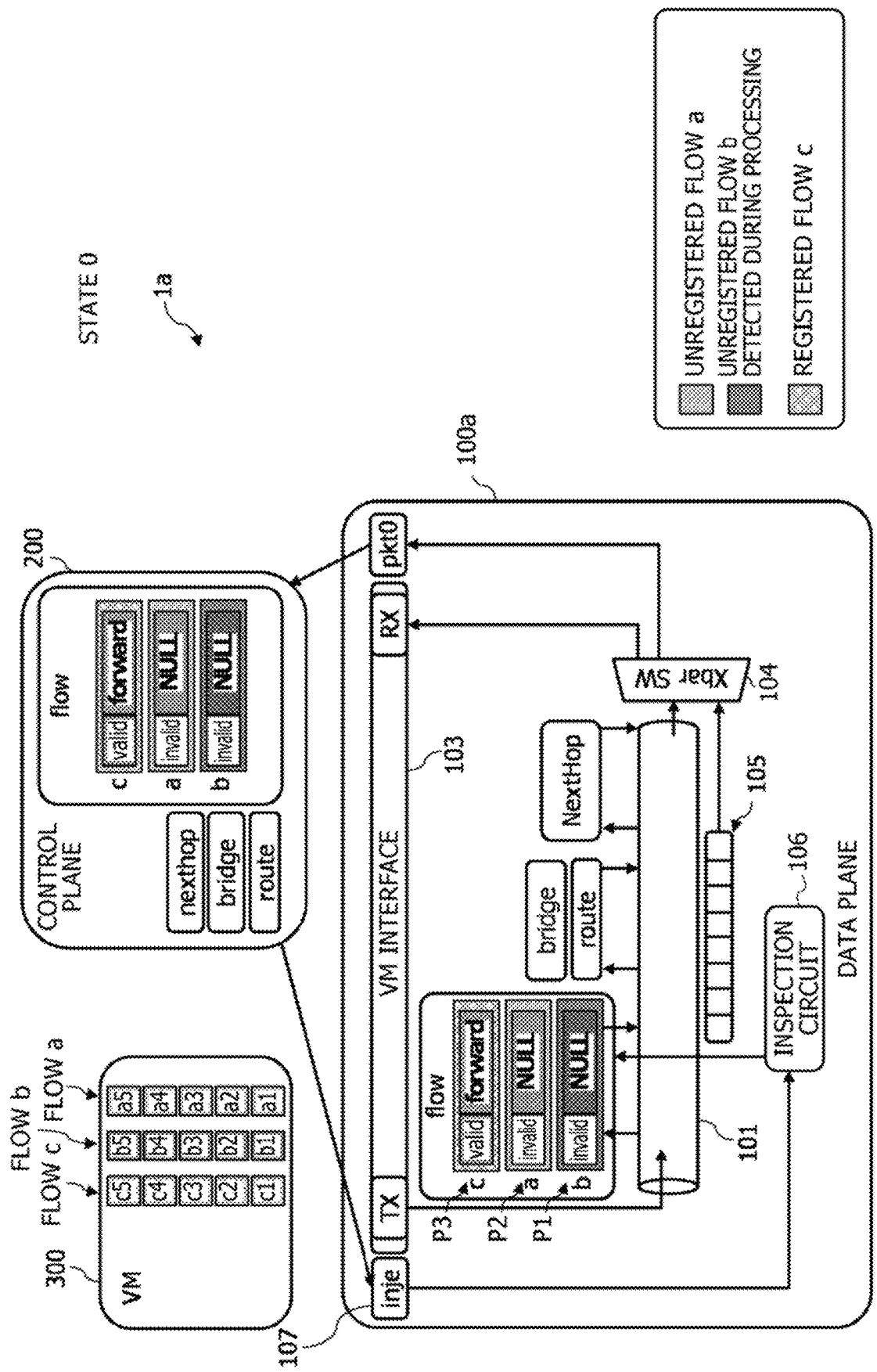
FIG. 7 is a diagram exemplarily illustrating a transition in the processing in the virtual router as an example of the first embodiment.

FIGS. 7 to 12 are diagrams exemplarily illustrating a transition of the processing in the virtual router 1a as an example of this first embodiment, FIG. 7 illustrates an initial state (state 0), and FIGS. 8 to 12 illustrates states 1 to 5, respectively.

Furthermore, in the examples illustrated in FIGS. 7 to 12, examples will be described in which the virtual machine 300 transmits a flow a including packets a1 to a5, a flow b including packets b1 to b5, and a flow c including packets c1 to c5, and transfer processing of the flow a will be mainly described.

The flow b is a flow detected during the processing of the flow a, and it is assumed that these flows a and b are not registered (invalid) in the flow table in the initial state (see reference signs P1 and P2 in FIG. 7). Furthermore, it is assumed that the flow c is registered (valid) in the flow table in the initial state (see a reference sign P3 in FIG. 7).

Figure 5:
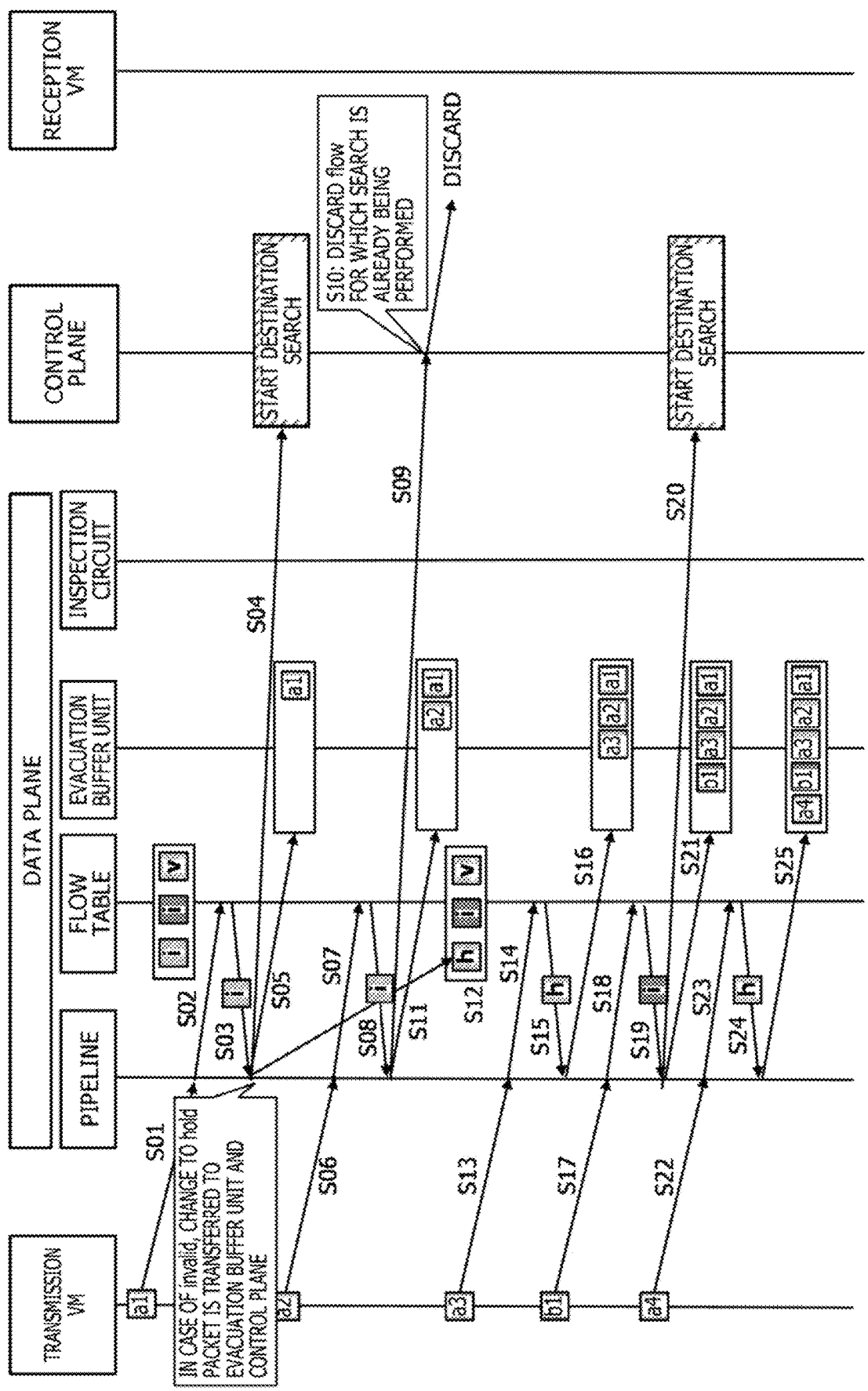
FIG. 5 is a timing chart describing processing in the virtual router as an example of the first embodiment.

The packet a1 transmitted from a virtual machine as a transmission source (transmission VM) 300 to a virtual machine as a transmission destination (reception VM) 300 is input to the pipeline 101 (a reference sign S01 in FIG. 5). The pipeline 101 refers to the flow table (a reference sign S02 in FIG. 5) and acquires that the flow a is invalid (detects a flow miss) (see a reference sign S03 in FIG. 5 and a reference sign P1 in FIG. 8).

Figure 8:
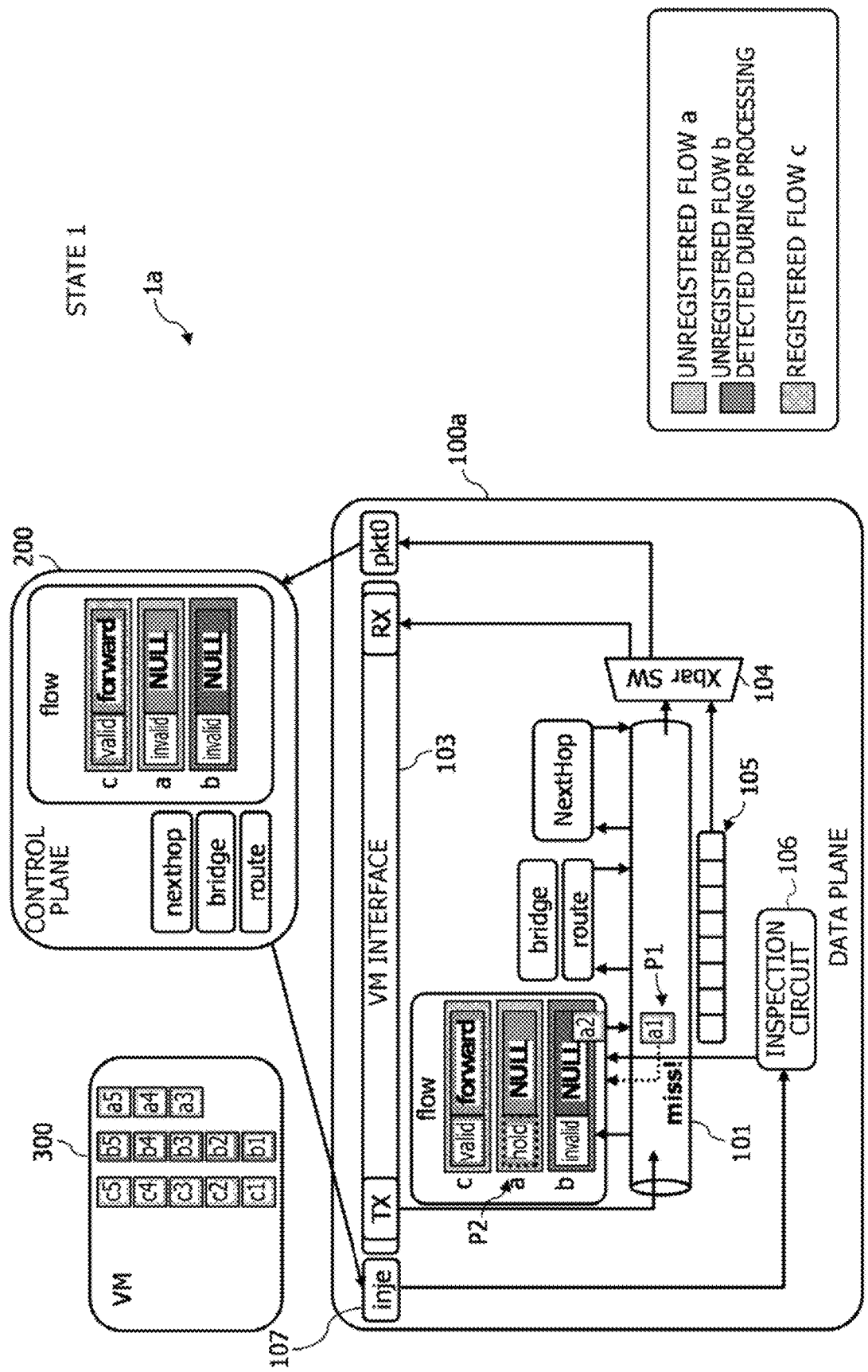
FIG. 8 is a diagram exemplarily illustrating the transition in the processing in the virtual router as an example of the first embodiment.

The pipeline 101 sets hold for management information of the flow a in the flow table (see a reference sign P2 in FIG. 8). Furthermore, the pipeline 101 transfers the packet a1 for which the flow miss occurs to the control plane 200 (see a reference sign S04 in FIG. 5 and a reference sign P1 in FIG. 9). In the control plane 200, a destination search for the flow a is started.

Figure 9:
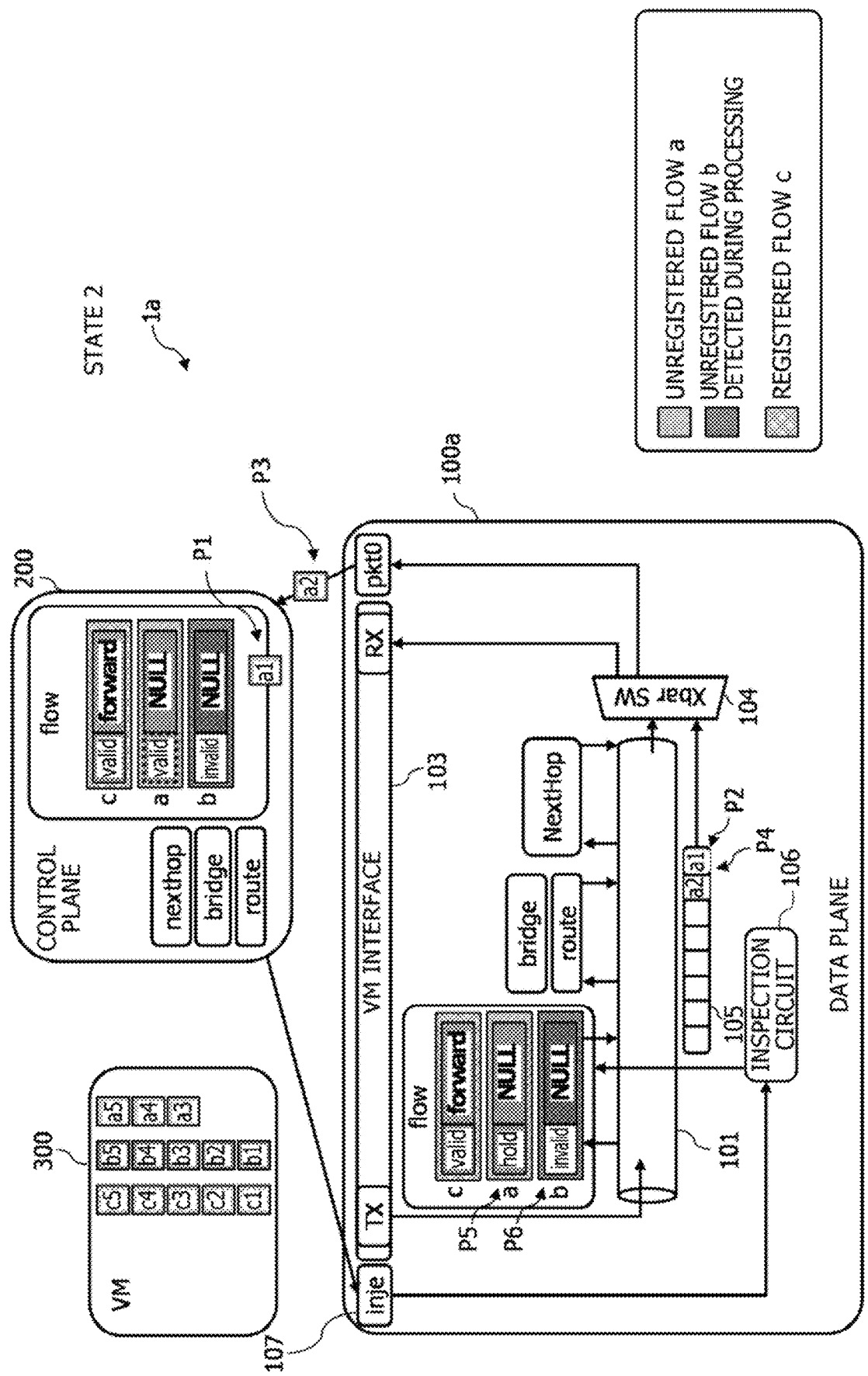
FIG. 9 is a diagram exemplarily illustrating the transition in the processing in the virtual router as an example of the first embodiment.

Moreover, the pipeline 101 registers the packet a1 in the evacuation buffer unit 105 (see a reference sign S05 in FIG. 5 and a reference sign P2 in FIG. 9).

Furthermore, the virtual machine as the transmission source (transmission VM) 300 transmits the packet a2 to the virtual machine as the transmission destination (reception VM) 300, and this packet a2 is input to the pipeline 101 (a reference sign S06 in FIG. 5). It is assumed that this packet a2 arrives at the pipeline 101 before hold is set in the management information of the flow a in the flow table.

The pipeline 101 refers to the flow table (a reference sign S07 in FIG. 5) and acquires that the flow a is invalid (detects a flow miss) (a reference sign S08 in FIG. 5).

The pipeline 101 transfers the packet a2 for which the flow miss occurs to the control plane 200 (see a reference sign S09 in FIG. 5 and a reference sign P3 in FIG. 9). In the control plane 200, since the destination search for the flow a is being performed, a destination search for the flow a based on this packet a2 is not performed, and the packet a2 is discarded from the control plane 200 (a reference sign S10 in FIG. 5).

Moreover, the pipeline 101 registers the packet a2 in the evacuation buffer unit 105 (see a reference sign S11 in FIG. 5 and a reference sign P4 in FIG. 9).

Here, hold is reflected in the management information of the flow a in the flow table (see a reference sign S12 in FIG. 5 and a reference sign P5 in FIG. 9).

Furthermore, the virtual machine as the transmission source (transmission VM) 300 transmits the packet a3 to the virtual machine as the transmission destination (reception VM) 300, and this packet a3 is input to the pipeline 101 (a reference sign S13 in FIG. 5). The pipeline 101 refers to the flow table (a reference sign S14 in FIG. 5) and acquires that the flow a is hold (a reference sign S15 in FIG. 5).

The pipeline 101 registers the packet a3 in the evacuation buffer unit 105 (see a reference sign S16 in FIG. 5).

Furthermore, the virtual machine as the transmission source (transmission VM) 300 outputs the packet b1 to be transmitted to the virtual machine as the transmission destination (reception VM) 300, and this packet b1 is input to the pipeline 101 (a reference sign S17 in FIG. 5). The pipeline 101 refers to the flow table (a reference sign S18 in FIG. 5) and acquires that the flow b is invalid (detects a flow miss) (see a reference sign S19 in FIG. 5 and a reference sign P6 in FIG. 9).

Figure 10:
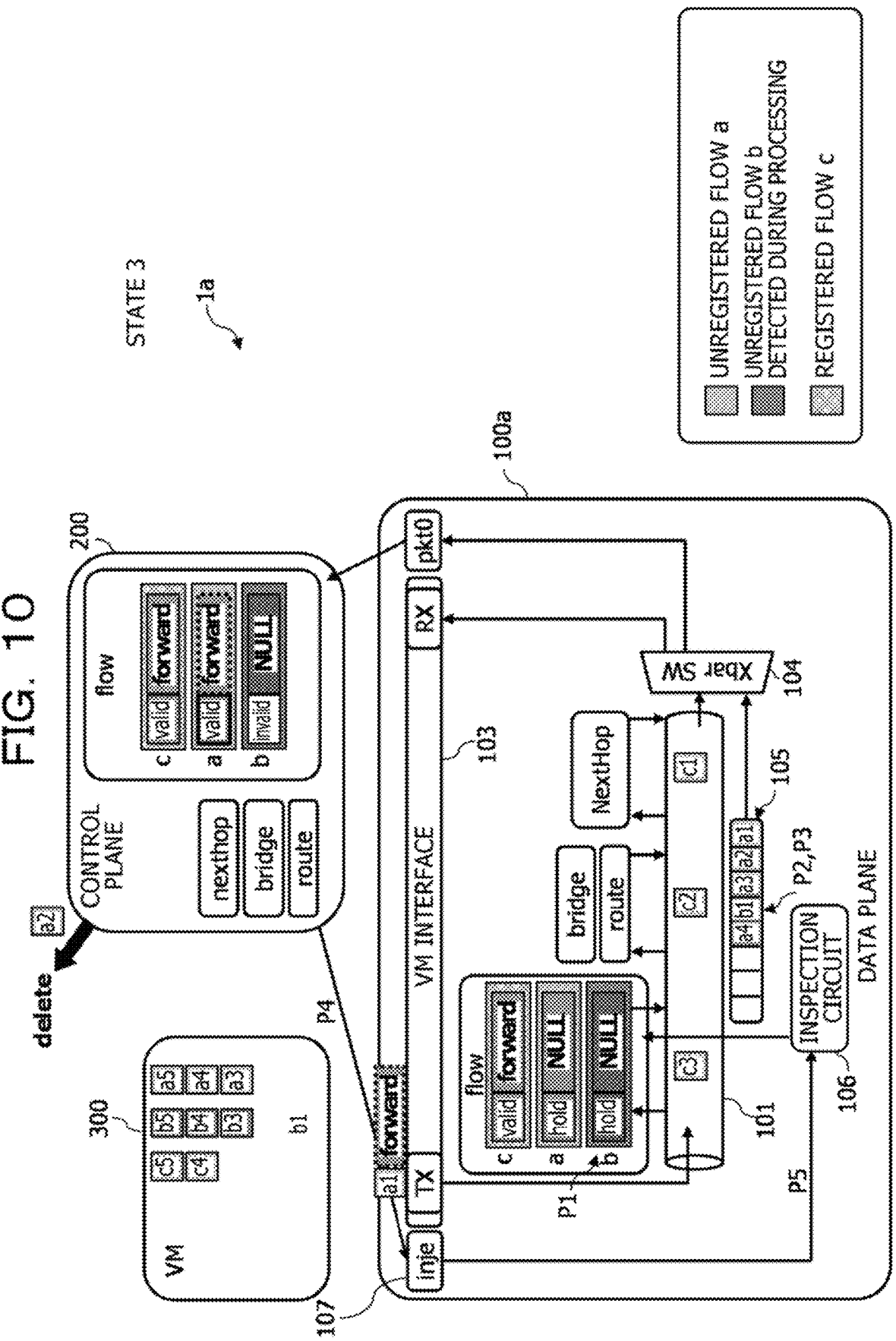
FIG. 10 is a diagram exemplarily illustrating the transition in the processing in the virtual router as an example of the first embodiment.

The pipeline 101 sets hold for management information of the flow b in the flow table (see a reference sign P1 in FIG. 10). Furthermore, the pipeline 101 transfers the packet b1 for which the flow miss occurs to the control plane 200 (see a reference sign S20 in FIG. 5). In the control plane 200, a destination search for the flow b is started.

Moreover, the pipeline 101 registers the packet b1 in the evacuation buffer unit 105 (see a reference sign S21 in FIG. 5 and a reference sign P2 in FIG. 10).

Furthermore, the virtual machine as the transmission source (transmission VM) 300 transmits the packet a4 to the virtual machine as the transmission destination (reception VM) 300, and this packet a4 is input to the pipeline 101 (a reference sign S22 in FIG. 5). The pipeline 101 refers to the flow table (a reference sign S23 in FIG. 5) and acquires that the flow a is hold (a reference sign S24 in FIG. 5).

Moreover, the pipeline 101 registers the packet a4 in the evacuation buffer unit 105 (see a reference sign S25 in FIG. 5 and a reference sign P3 in FIG. 10).

Figure 6:
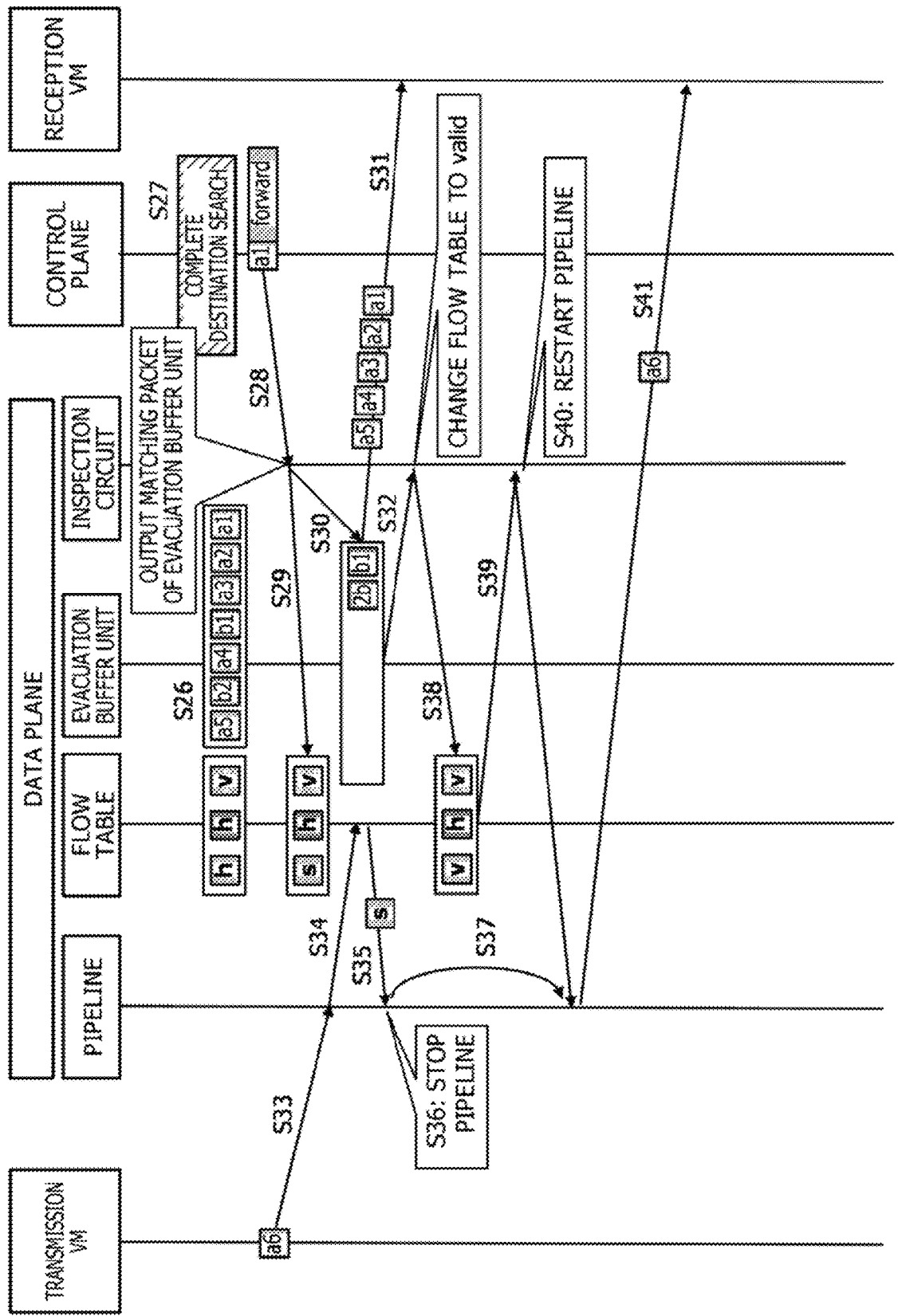
FIG. 6 is a timing chart describing the processing in the virtual router as an example of the first embodiment.
Figure 11:
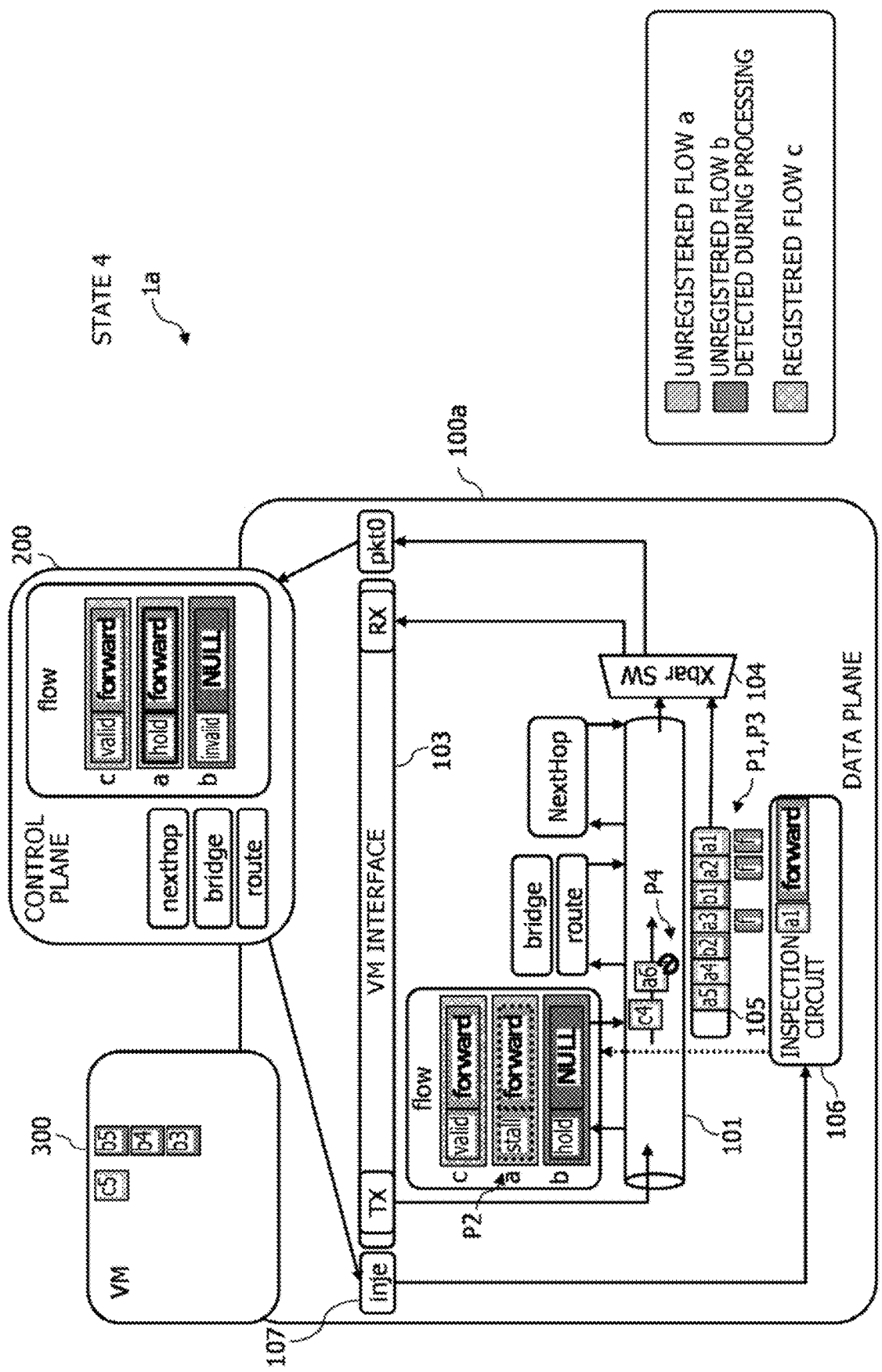
FIG. 11 is a diagram exemplarily illustrating the transition in the processing in the virtual router as an example of the first embodiment.

Thereafter, in a similar manner, the packets b2 and a5 are transmitted from the virtual machine as the transmission source (transmission VM) 300 to the virtual machine as the transmission destination (reception VM) 300, similar processing is performed, and these packets b2 and a5 are registered in the evacuation buffer unit 105 (see a reference sign S26 in FIG. 6 and a reference sign P1 in FIG. 11).

Here, when the destination search is completed in the control plane 200 (a reference sign S27 in FIG. 6), the control plane 200 attaches forward to the packet a1 and transfers the packet a1 to the reintroduction port 107.

The packet a1 to which forward is attached and which is input to the reintroduction port 107 is input to the inspection circuit 106a (see a reference sign S28 in FIG. 6 and a reference sign P4 in FIG. 10). The inspection circuit 106a registers (sets) stall for the flow a of the corresponding packet a1 in the flow table (see a reference sign S29 in FIG. 6 and a reference sign P2 in FIG. 11).

The inspection circuit 106a acquires destination information from the packet a1 to which forward is attached, and adds the destination information to each of the packets (a1 to a5) belonging to the corresponding flow (flow a in this example) stored in the evacuation buffer unit 105 (see a reference sign S30 in FIG. 6 and a reference sign P3 in FIG. 11). In the inspection circuit 106a, the order control circuit 1063 outputs each of the packets a1 to a5 belonging to the same flow as the packet a1 among a plurality of packets stored in the evacuation buffer unit 105 (see a reference sign S31 in FIG. 6 and a reference sign P1 in FIG. 12). The crossbar switch 104 transmits these packets output from the evacuation buffer unit 105 to the virtual machine as the transmission destination (reception VM) 300.

Figure 12:
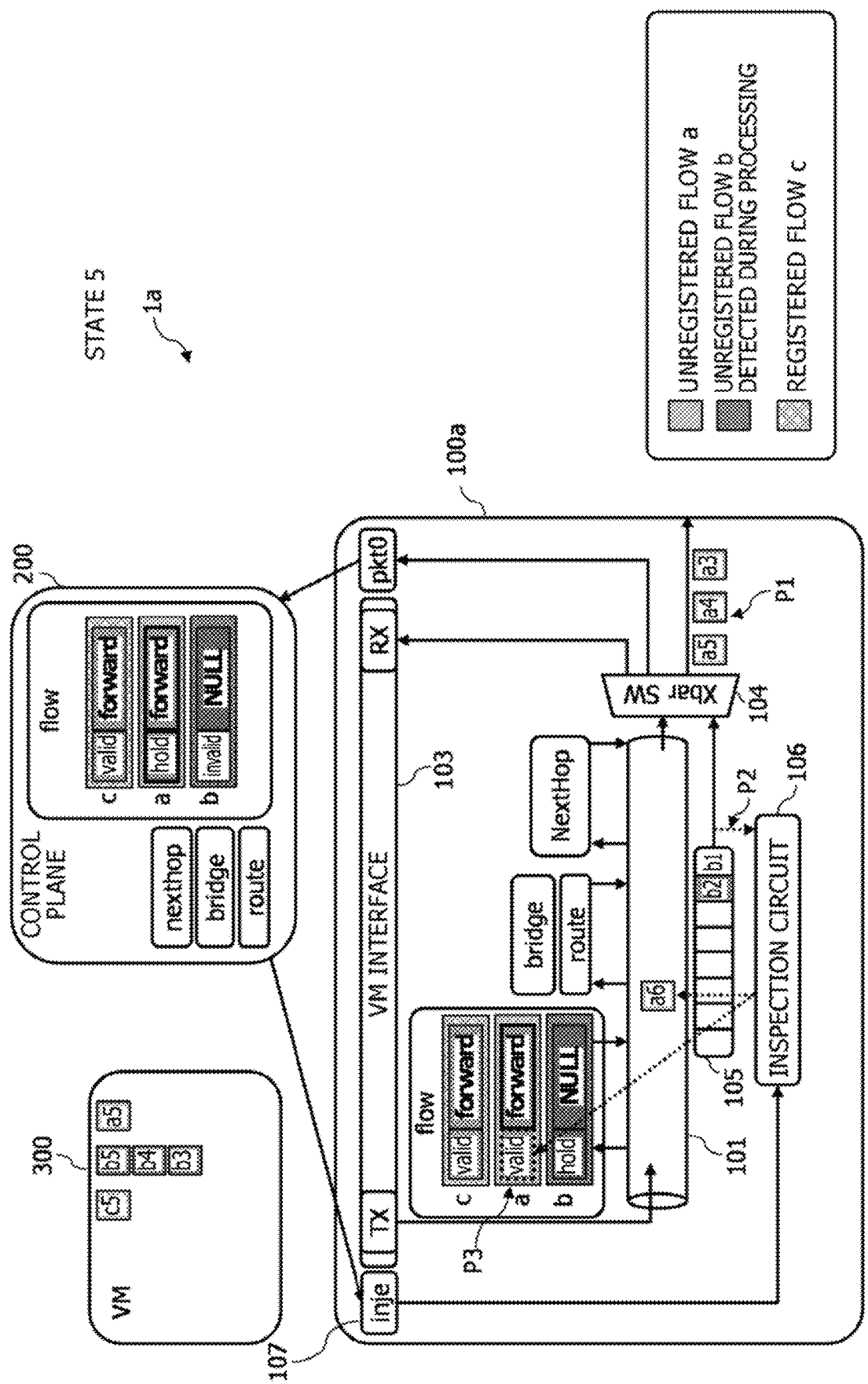
FIG. 12 is a diagram exemplarily illustrating the transition in the processing in the virtual router as an example of the first embodiment.

The switching determination unit 1056 of the evacuation buffer unit 105 inputs, to the order control circuit 1063, an output completion report indicating that all the packets a1 to a5 belonging to the flow a are output from the FIFO buffer 1052 (see a reference sign S32 in FIG. 6 and a reference sign P2 in FIG. 12).

Furthermore, here, the virtual machine as the transmission source (transmission VM) 300 outputs a packet a6 to be transmitted to the virtual machine as the transmission destination (reception VM) 300, and this packet a6 is input to the pipeline 101 (a reference sign S33 in FIG. 6). The pipeline 101 refers to the flow table (a reference sign S34 in FIG. 6) and acquires that the flow a is stall (a reference sign S35 in FIG. 6). With this configuration, the corresponding pipeline 101 stops the pipeline 101 (a reference sign S36 in FIG. 6). With this configuration, the packet a6 is held on the pipeline 101 (see a reference sign S37 in FIG. 6 and a reference sign P4 in FIG. 11).

On the other hand, in the inspection circuit 106a in which the output completion report is input from the switching determination unit 1056, the valid write control unit 1064 registers (sets) valid for the flow (flow to be processed) a in the flow table (see a reference sign S38 in FIG. 6 and a reference sign P3 in FIG. 12). Furthermore, the valid write control unit 1064 inputs a notification that the output of the flow to be processed is completed to the restart instruction unit 1065.

When valid is set for the flow in the flow table (a reference sign S39 in FIG. 6), the restart instruction unit 1065 causes the pipeline 101 to restart (a reference sign S40 in FIG. 6). With this configuration, the packet a6 held on the pipeline 101 is output and transmitted to the virtual machine as the transmission destination (reception VM) 300 (a reference sign S41 in FIG. 6).

In the virtual machine as the transmission destination (reception VM) 300, the packets a1 to a5 of the flow a are received in a correct order.

Next, processing of the pipeline 101 in the virtual router 1a as an example of the first embodiment configured as described above will be described with reference to a flowchart (Steps A1 to A14) illustrated in FIG. 13.

Figure 13:
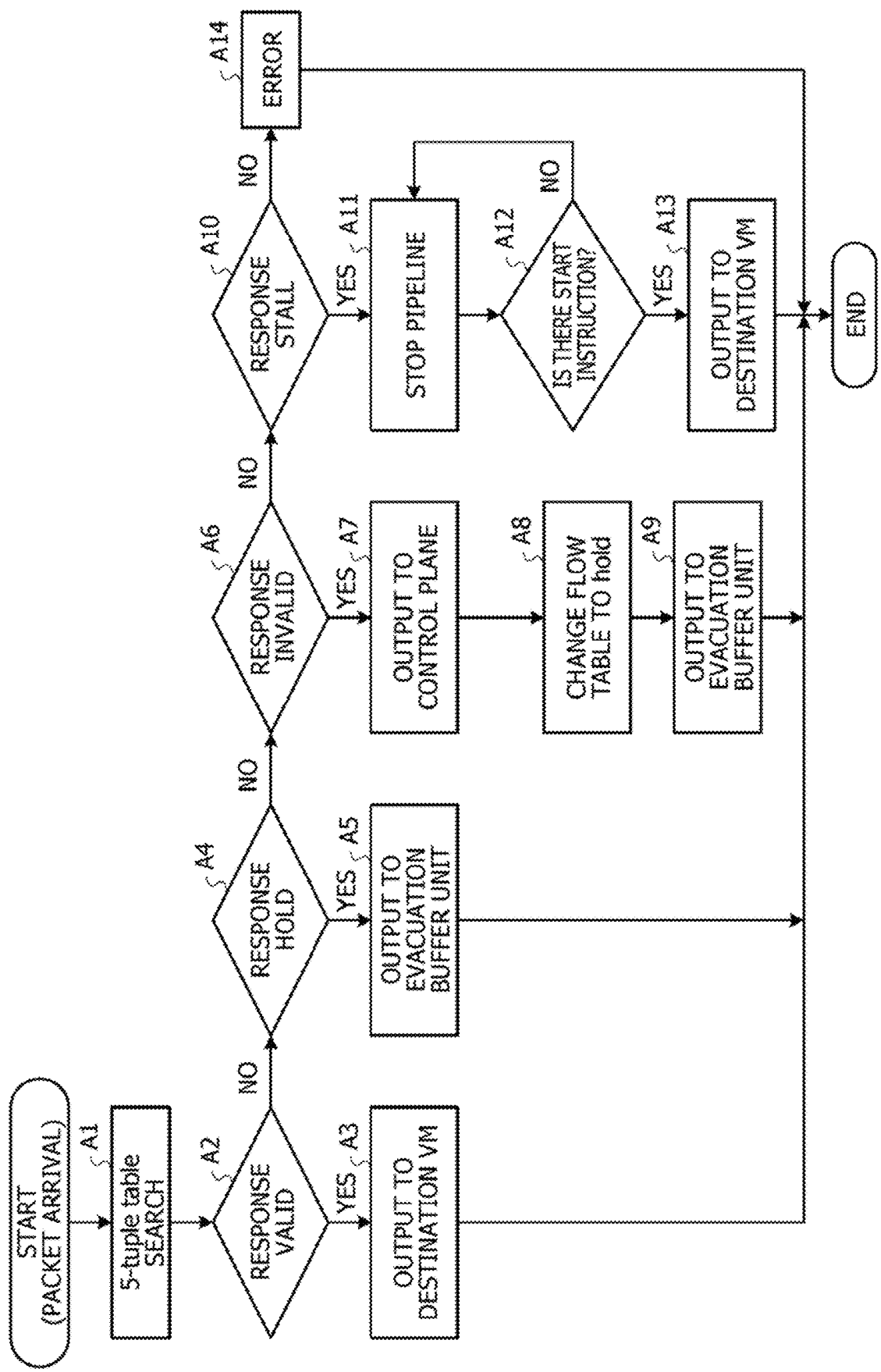
FIG. 13 is a flowchart for describing processing of a pipeline in the virtual router as an example of the first embodiment.

The processing illustrated in FIG. 13 is started when a packet output from the virtual machine 300 arrives at the pipeline 101.

In Step A1, the pipeline 101 searches the flow table by using a hash value calculated based on the 5-tuple of the input packets.

In Step A2, the pipeline 101 confirms whether a response from the flow table is valid. As a result of this confirmation, when the response from the flow table is valid (see YES route in Step A2), in Step A3, the pipeline 101 outputs the corresponding packet to the destination virtual machine 300 obtained by referring to the flow table. Thereafter, the processing ends.

As a result of the confirmation in Step A2, when the response from the flow table is not valid (see NO route in Step A2), the processing proceeds to Step A4. In Step A4, the pipeline 101 confirms whether the response from the flow table is hold. As a result of this confirmation, when the response from the flow table is hold (see YES route in Step A4), in Step A5, the pipeline 101 outputs the corresponding packet to the evacuation buffer unit 105. Thereafter, the processing ends.

Furthermore, as a result of the confirmation in Step A4, when the response from the flow table is not hold (see NO route in Step A4), the processing proceeds to Step A6. In Step A6, the pipeline 101 confirms whether the response from the flow table is invalid. As a result of this confirmation, when the response from the flow table is invalid (see YES route in Step A6), in Step A7, the pipeline 101 outputs the corresponding packet to the control plane 200.

In Step A8, the pipeline 101 changes management information of a flow to which the corresponding packet belongs in the flow table to hold. Then, in Step A9, the pipeline 101 outputs the corresponding packet to the evacuation buffer unit 105, and the processing ends.

As a result of the confirmation in Step A6, when the response from the flow table is not invalid (see NO route in Step A6), the processing proceeds to Step A10. In Step A10, the pipeline 101 confirms whether the response from the flow table is stall. As a result of this confirmation, when the response from the flow table is stall (see YES route in Step A10), in Step A11, the corresponding pipeline 101 stops the pipeline 101.

In Step A12, the pipeline 101 confirms whether a start instruction of the pipeline 101 has been input. When the start instruction of the pipeline 101 has not been input (see NO route in Step A12), the processing returns to Step A11 to continue stopping the pipeline 101.

When the start instruction of the pipeline 101 is input (see YES route in Step A12), in Step A13, the pipeline 101 outputs the corresponding packet to the destination virtual machine 300 obtained by referring to the flow table. Thereafter, the processing ends.

As a result of the confirmation in Step A10, when the response from the flow table is not stall (see NO route in Step A10), the processing proceeds to Step A14. In Step A14, the pipeline 101 performs predetermined processing when an error occurs, such as outputting an error message. Thereafter, the processing ends.

(C) Effects

In this way, according to the virtual router 1a as an example of the first embodiment, the evacuation buffer unit 105 is included, and a packet for which a flow miss occurs, for example, a packet belonging to a flow for which invalid is set in the flow table is stored in this evacuation buffer unit 105.

Furthermore, the pipeline 101 stores, in the evacuation buffer unit 105, a packet belonging to a flow for which hold is set in the flow table.

An action is registered in the flow table by the control plane 200, and stall is set in management information in the flow table for a flow to which a packet in a state where the packet of the corresponding flow is reintroduced to the reintroduction port 107 belongs.

Then, the pipeline 101 stops the corresponding pipeline 101 when the packet belonging to the flow for which stall is set in the flow table is input. This suppresses output of a packet following the packet belonging to the same flow stored in the evacuation buffer unit 105 from the pipeline 101.

Therefore, even when a flow miss occurs in the virtual router 1a in which hard offload by the FPGA 10 is implemented, a destination search is performed in the control plane 200, and it is possible to suppress occurrence of order inversion for packets transmitted while the flow table is updated. Furthermore, this makes it possible to suppress retransmission of the flow caused by the order inversion of the packets, and it is possible to implement more efficient packet transfer.

The evacuation buffer unit 105 includes the plurality of FIFO buffers 1052 and the plurality of comparators 1054 corresponding to these FIFO buffers 1052. Then, in the comparator 1054, a hash value of a packet output from the FIFO buffer 1052 is compared with a hash value of a packet to be compared input from the order control circuit 1063.

As a result of this comparison, when the hash values match, the comparator 1054 outputs the packet output from the FIFO buffer 1052 to the crossbar switch 104. Furthermore, as a result of the comparison, when the hash values do not match, the comparator 1054 causes another FIFO buffer 1052 to store the packet output from the FIFO buffer 1052.

This makes it possible to easily select and output only a packet belonging to a flow specified by the order control circuit 1063 from the evacuation buffer unit 105.

(II) Description of Second Embodiment (A) Structure

A function of a virtual router 1b as an example of a second embodiment is also implemented by an information processing device 20 in a similar manner to the virtual router 1a of the first embodiment.

Figure 14:
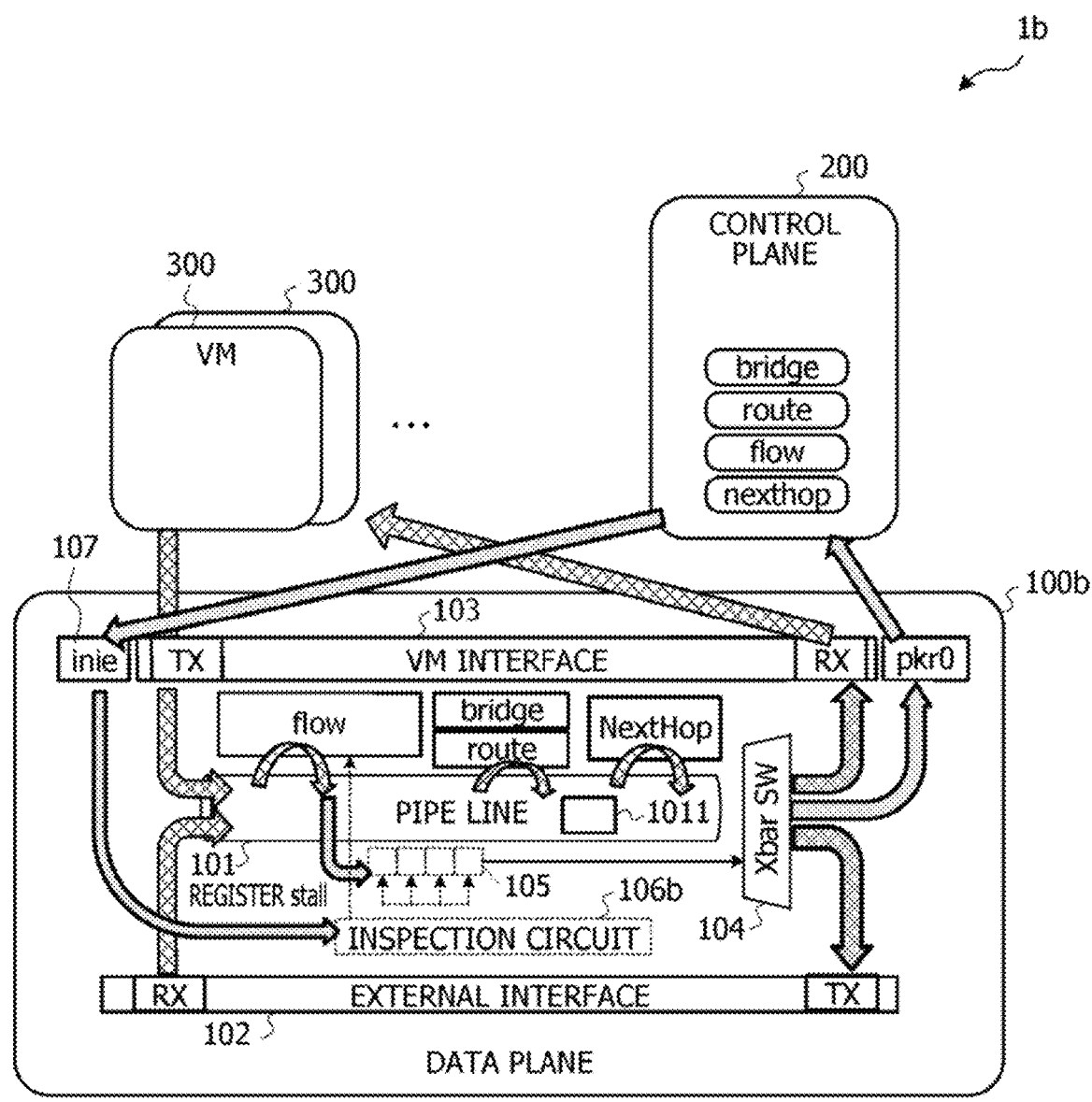
FIG. 14 is a diagram illustrating a functional structure of a virtual router as an example of a second embodiment.

FIG. 14 is a diagram illustrating a functional structure of the virtual router 1b as an example of the second embodiment.

The virtual router 1b of the second embodiment includes an inspection circuit 106b instead of the inspection circuit 106a of the virtual router 1a of the first embodiment, and also includes a 1st_hold setting unit 1011, and other portions are configured in a similar manner to the virtual router 1*a* of the first embodiment.

Hereinafter, in the drawings, similar portions to the aforementioned portions are denoted by the same reference signs as those of the aforementioned portions, and thus the description thereof will be omitted.

The 1st_hold setting unit 1011 sets a management flag (1st_hold flag) for a packet that is first detected as a packet for which hold is set as management information among packets input to a pipeline 101. The 1st_hold flag may also be set, for example, in a specific area in a header of the corresponding packet.

Here, as a time reference (determination start reference time) for determining whether the packet is the packet that is first detected as the packet for which hold is set, a start time of this virtual router 1*b* may also be used as a starting point. Furthermore, thereafter, when an input of a packet to this virtual router 1*b* does not occur for a predetermined time or longer, the determination start reference time may be set to the time when the absence of the input of the packet is detected to have continued for the predetermined time or longer. Furthermore, the determination start reference time may also be updated every time a predetermined time determined in advance elapses, and may be appropriately changed and implemented.

Note that, when a flow miss is detected in the pipeline 101, hold is set for a flow to which the corresponding packet belongs in a flow table.

The pipeline 101 transfers the packet for which the 1st_hold flag is set to a control plane 200. Hereinafter, the packet for which the 1st_hold flag is set may also be called a 1st_hold packet.

Furthermore, the pipeline 101 stores, in an evacuation buffer unit 105, a following packet belonging to the same flow as the packet for which the 1st_hold flag is set.

The function as the 1st_hold setting unit 1011 may also be provided as the function of the pipeline 101, and may be appropriately changed and implemented.

Figure 15:
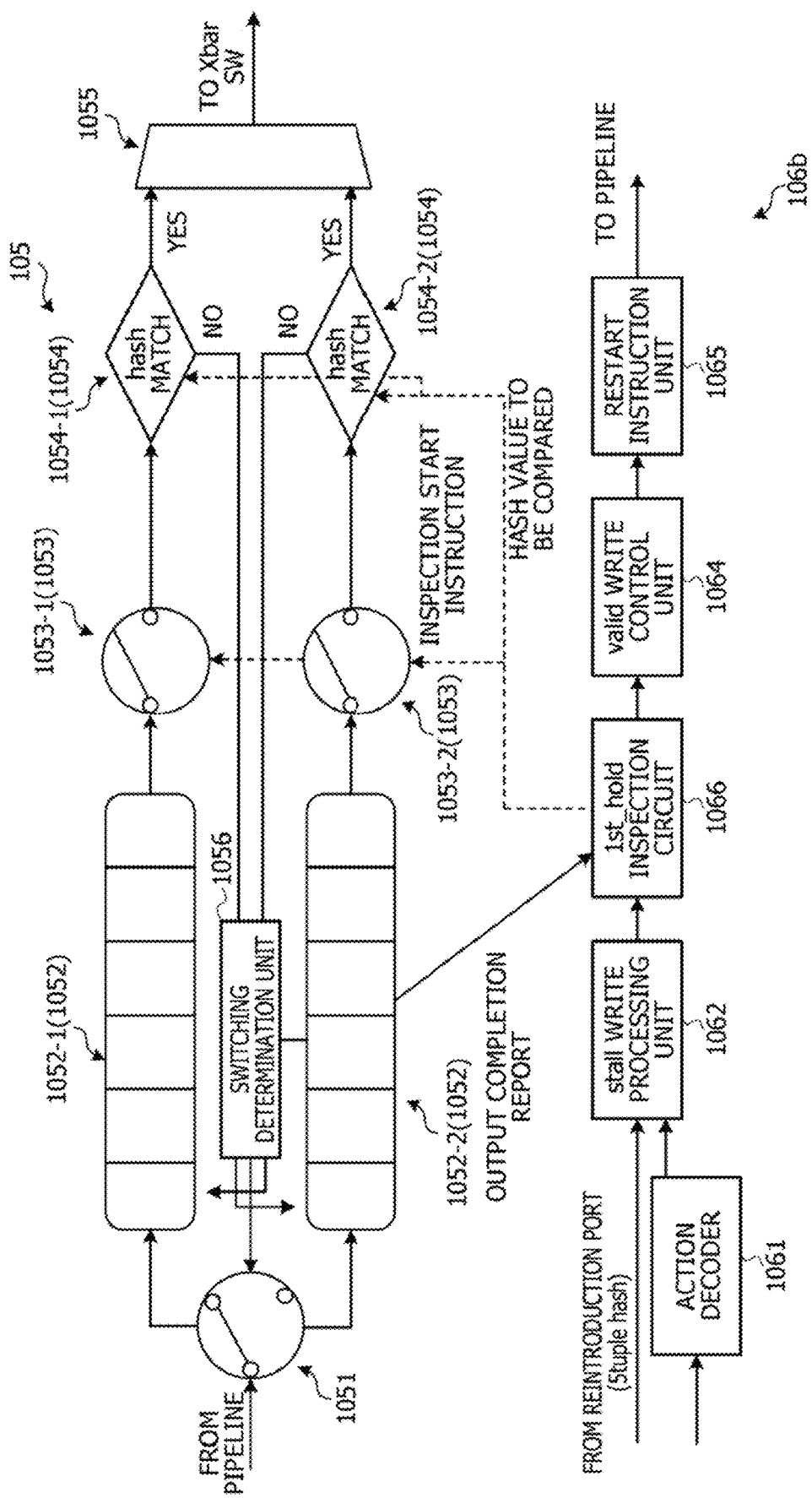
FIG. 15 is a diagram exemplarily illustrating a structure of an evacuation buffer unit and an inspection circuit in the virtual router as an example of the second embodiment.

FIG. 15 is a diagram exemplarily illustrating a structure of the evacuation buffer unit 105 and the inspection circuit 106*b* in the virtual router 1*b* as an example of the second embodiment.

As illustrated in FIG. 15, the inspection circuit 106*b* includes a 1st_hold inspection circuit 1066 instead of the order control circuit 1063 of the inspection circuit 106*a* of the first embodiment illustrated in FIG. 4, and other portions are configured in a similar manner to the inspection circuit 106*a* of the first embodiment.

The 1st_hold inspection circuit 1066 determines whether or not the 1st_hold flag is set in a packet. For example, when "1" is set in a specific area of a header of a packet, the 1st_hold inspection circuit 1066 may determine that the 1st_hold flag is set in the corresponding packet.

In this second embodiment, when the 1st_hold inspection circuit 1066 confirms that the 1st_hold flag is set for the packet, a stall write processing unit 1062 sets stall for a flow to which the corresponding packet belongs in the flow table.

Furthermore, as in the order control circuit 1063 of the first embodiment, the 1st_hold inspection circuit 1066 inputs an inspection start instruction to each output control switch 1053, and sequentially outputs packets stored in each FIFO buffer 1052 to a comparator 1054.

Moreover, an output completion report indicating that all packets belonging to one flow are output from the FIFO buffer 1052 is input to the 1st_hold inspection circuit 1066 from a switching determination unit 1056 of the evacuation buffer unit 105. When the output completion report is input from the switching determination unit 1056, the 1st_hold inspection circuit 1066 inputs a notification that the output of the flow to be processed is completed to a valid write control unit 1064.

(B) Operation

Processing in the virtual router 1*b* as an example of the second embodiment configured as described above will be described with reference to FIGS. 18 to 24 according to timing charts illustrated in FIGS. 16 and 17.

Figure 18:
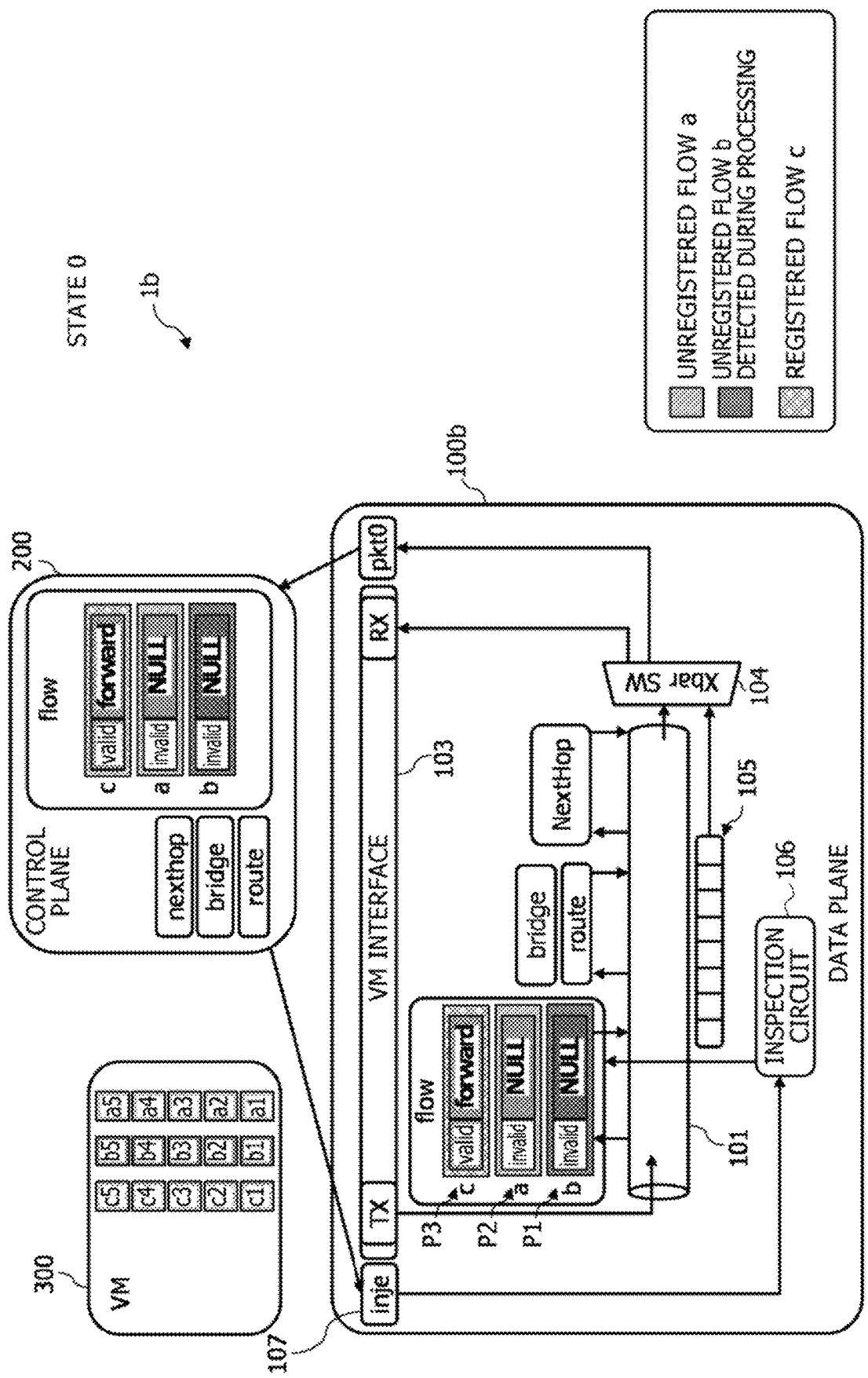
FIG. 18 is a diagram exemplarily illustrating a transition in the processing in the virtual router as an example of the second embodiment.

FIGS. 18 to 24 are diagrams exemplarily illustrating a transition of the processing in the virtual router 1*b* as an example of this second embodiment, FIG. 18 illustrates an initial state (state 0), and FIGS. 19 to 24 illustrates states 1 to 6, respectively.

Furthermore, also in the example illustrated in FIGS. 18 to 24, similarly to FIGS. 7 to 12, an example will be described in which the virtual machine 300 transmits a flow a including packets a1 to a5, a flow b including packets b1 to b5, and a flow c including packets c1 to c5, and transfer processing of the flow a will be mainly described.

Note that, in the drawings, the same reference signs as the aforementioned reference signs indicate the same or substantially the same processing, and thus detailed description thereof will be omitted.

The flow b is a flow detected during the processing of the flow a, and it is assumed that these flows a and b are not registered (invalid) in the flow table in the initial state (see reference signs P1 and P2 in FIG. 18). Furthermore, it is assumed that the flow c is registered (valid) in the flow table in the initial state (see a reference sign P3 in FIG. 18).

Figure 16:
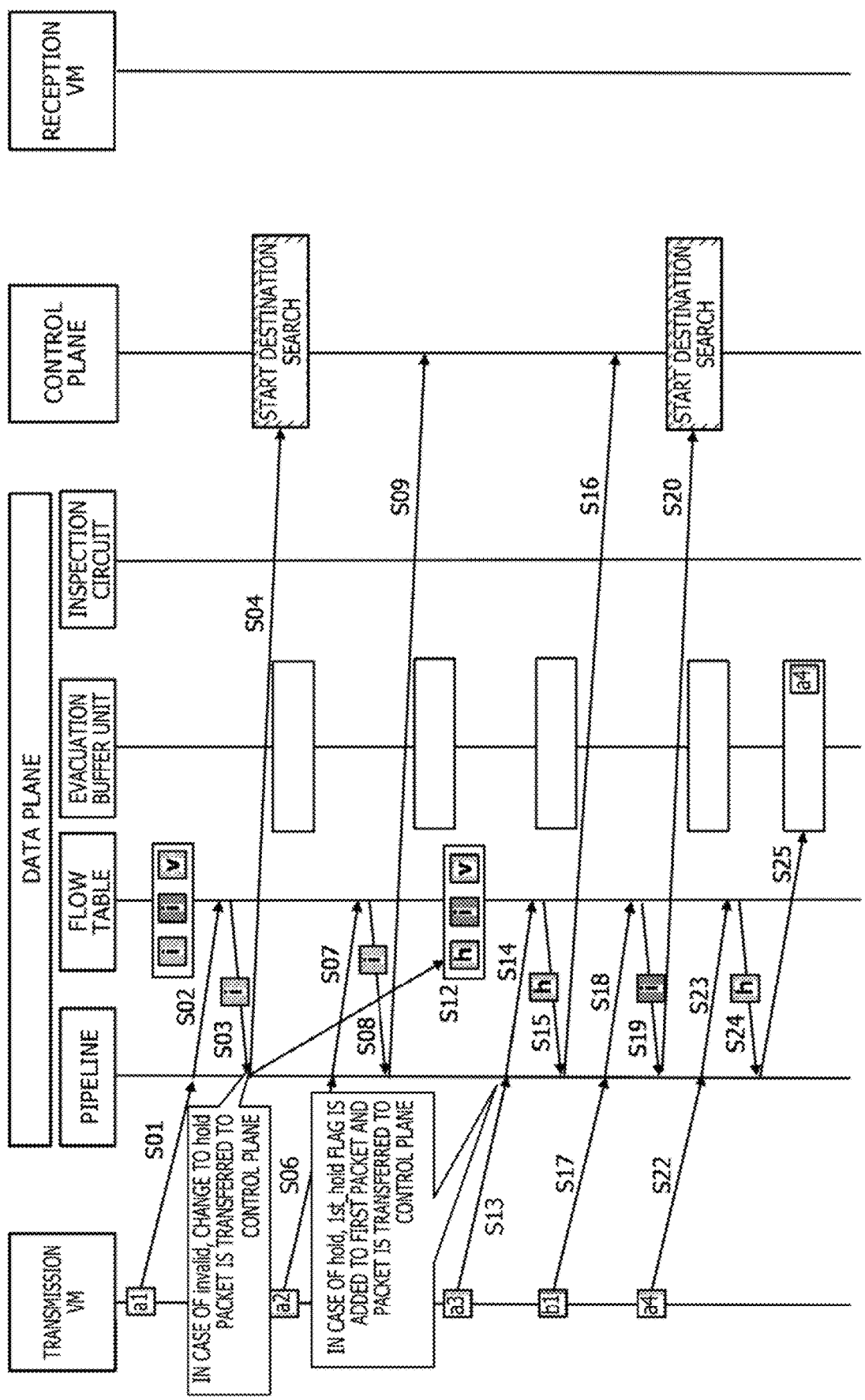
FIG. 16 is a timing chart for describing processing in the virtual router as an example of the second embodiment.

The packet a1 output to be transmitted from a virtual machine as a transmission source (transmission VM) 300 to a virtual machine as a transmission destination (reception VM) 300 is input to the pipeline 101 (a reference sign S01 in FIG. 16). The pipeline 101 refers to the flow table (a reference sign S02 in FIG. 16) and acquires that the flow a is invalid (detects a flow miss) (see a reference sign S03 in FIG. 16 and a reference sign P1 in FIG. 19).

Figure 19:
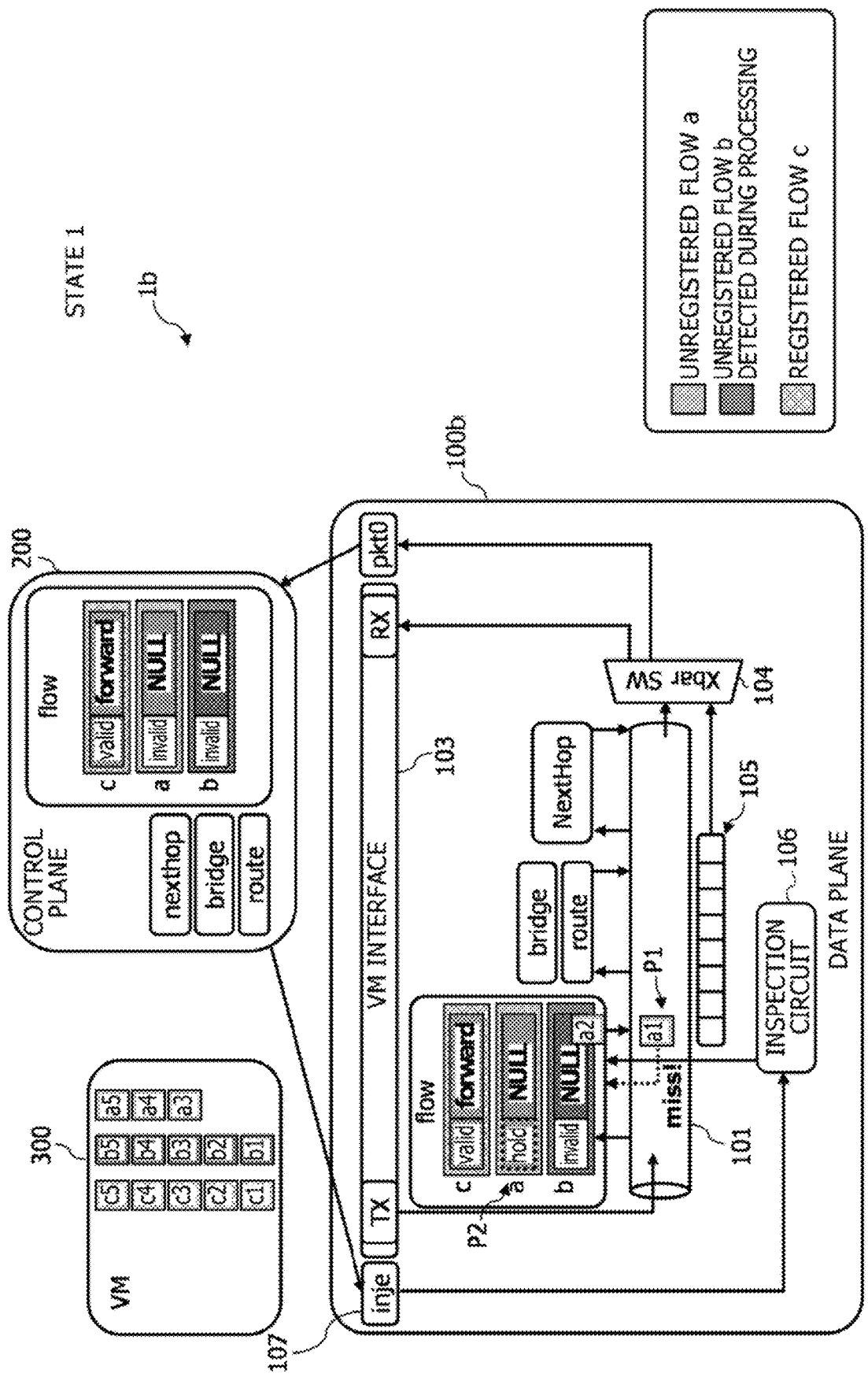
FIG. 19 is a diagram exemplarily illustrating the transition in the processing in the virtual router as an example of the second embodiment.

The pipeline 101 sets hold for management information of the flow a in the flow table (see a reference sign P2 in FIG. 19). Furthermore, the pipeline 101 transfers the packet a1 for which the flow miss occurs to the control plane 200 (see a reference sign S04 in FIG. 16 and a reference sign P1 in FIG. 20). In the control plane 200, a destination search for the flow a is started.

Furthermore, the virtual machine as the transmission source (transmission VM) 300 outputs the packet a2 to be transmitted to the virtual machine as the transmission destination (reception VM) 300, and this packet a2 is input to the pipeline 101 (a reference sign S06 in FIG. 16). It is assumed that this packet a2 arrives at the pipeline 101 before hold is set in the management information of the flow a in the flow table.

The pipeline 101 refers to the flow table (a reference sign S07 in FIG. 16) and acquires that the flow a is invalid (detects a flow miss) (a reference sign S08 in FIG. 16).

Figure 20:
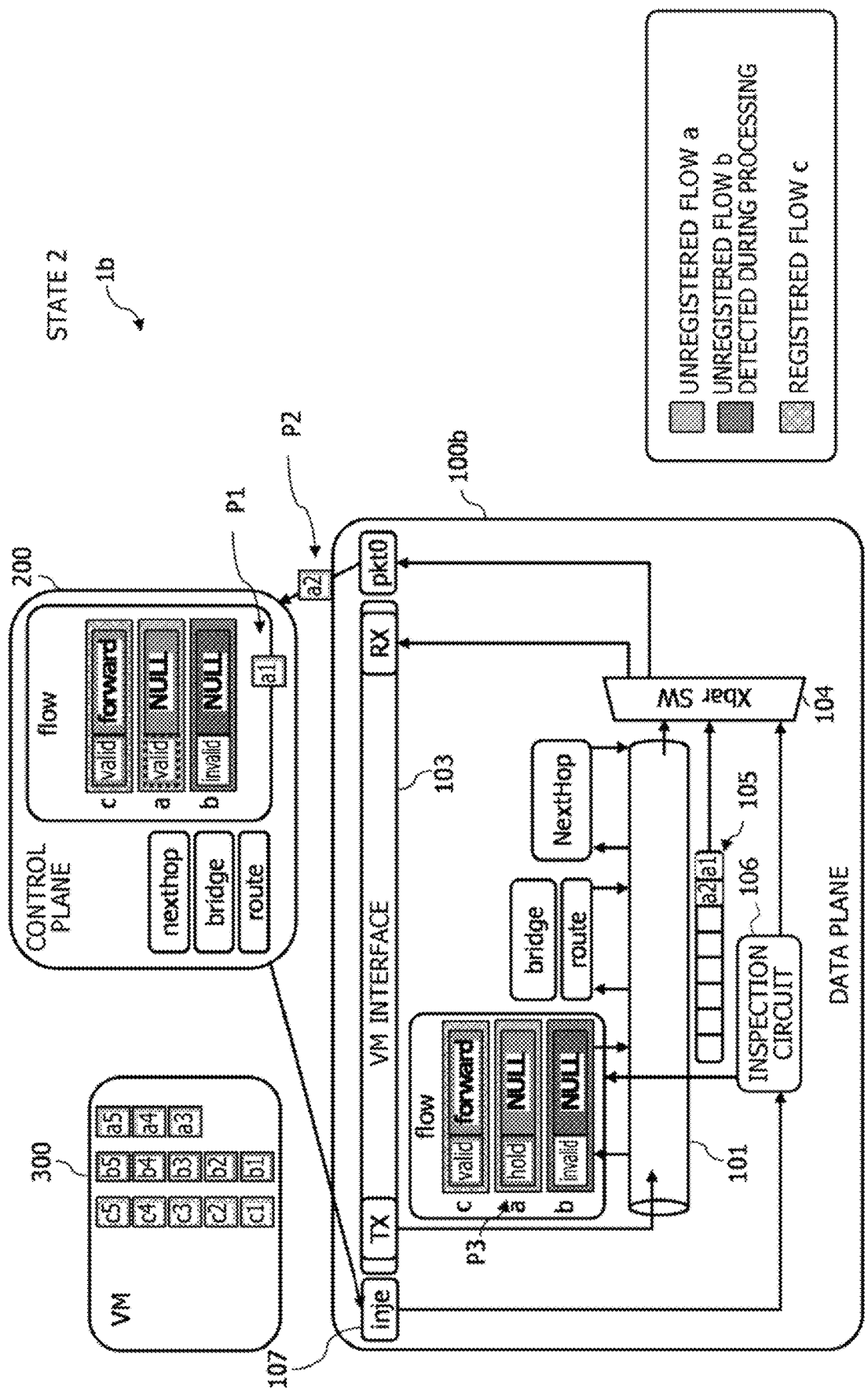
FIG. 20 is a diagram exemplarily illustrating the transition in the processing in the virtual router as an example of the second embodiment.

The pipeline 101 transfers the packet a2 for which the flow miss occurs to the control plane 200 (see a reference sign S09 in FIG. 16 and a reference sign P2 in FIG. 20).

Figure 21:
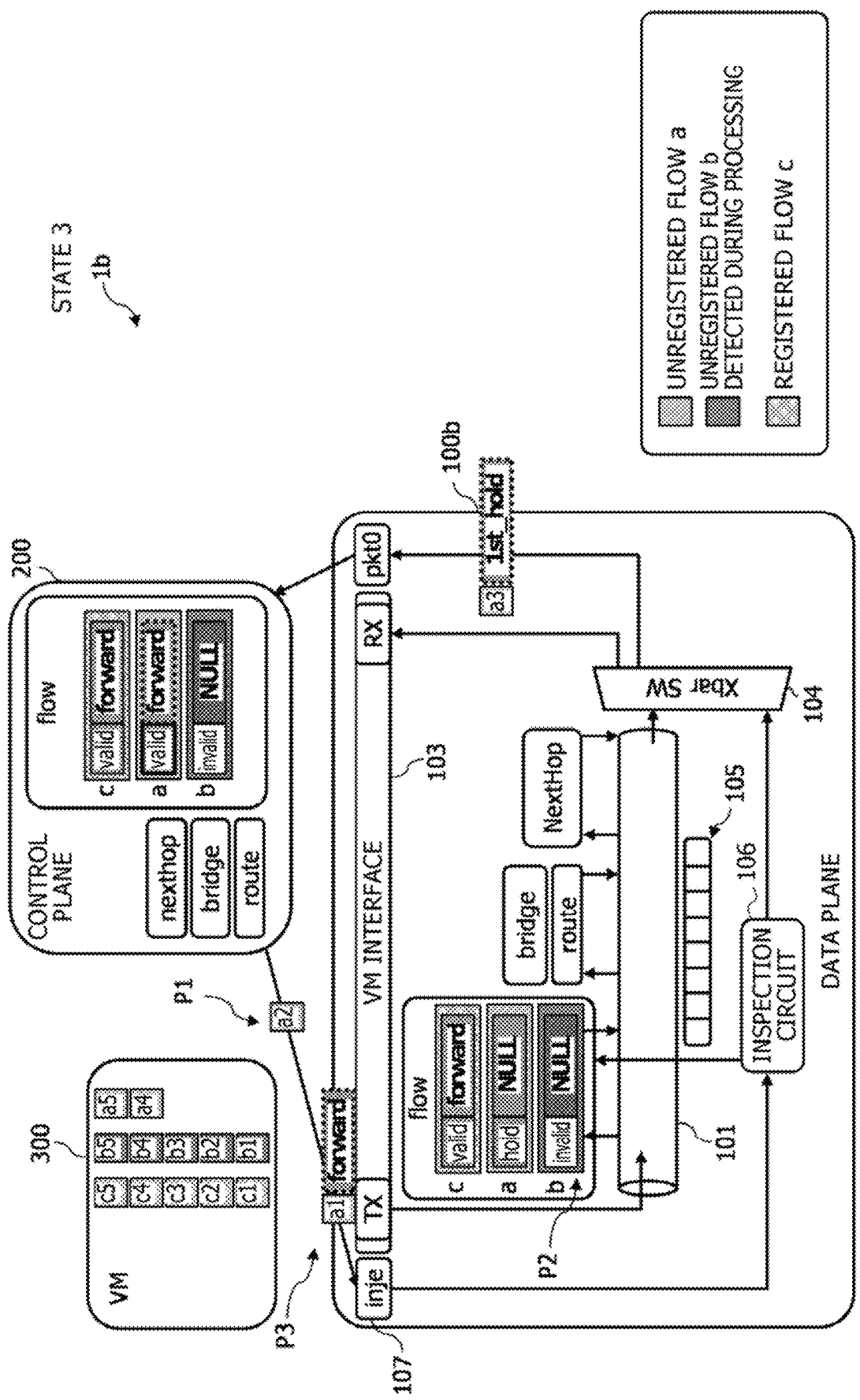
FIG. 21 is a diagram exemplarily illustrating the transition in the processing in the virtual router as an example of the second embodiment.

The control plane 200 inputs the packet a2 to the reintroduction port 107 (see a reference sign P1 in FIG. 21).

Here, hold is reflected in the management information of the flow a in the flow table (see a reference sign S12 in FIG. 16 and a reference sign P3 in FIG. 20).

Furthermore, the virtual machine as the transmission source (transmission VM) 300 outputs the packet a3 to be transmitted to the virtual machine as the transmission destination (reception VM) 300, and this packet a3 is input to the pipeline 101 (a reference sign S13 in FIG. 16).

The pipeline 101 refers to the flow table (a reference sign S14 in FIG. 16) and acquires that the flow a is hold (a reference sign S15 in FIG. 16). The 1st_hold setting unit 1011 sets the 1st_hold flag for the packet a3 for which hold is first set. The pipeline 101 transfers the packet a3 for which the 1st_hold flag is set to the control plane 200 (a reference sign S16 in FIG. 16). The pipeline 101 stores the packet of the flow a following the packet a3 in the evacuation buffer unit 105.

Furthermore, the virtual machine as the transmission source (transmission VM) 300 outputs the packet b1 to be transmitted to the virtual machine as the transmission destination (reception VM) 300, and this packet b1 is input to the pipeline 101 (a reference sign S17 in FIG. 16). The pipeline 101 refers to the flow table (a reference sign S18 in FIG. 16) and acquires that the flow b is invalid (detects a flow miss) (see a reference sign S19 in FIG. 16 and a reference sign P2 in FIG. 21).

Figure 22:
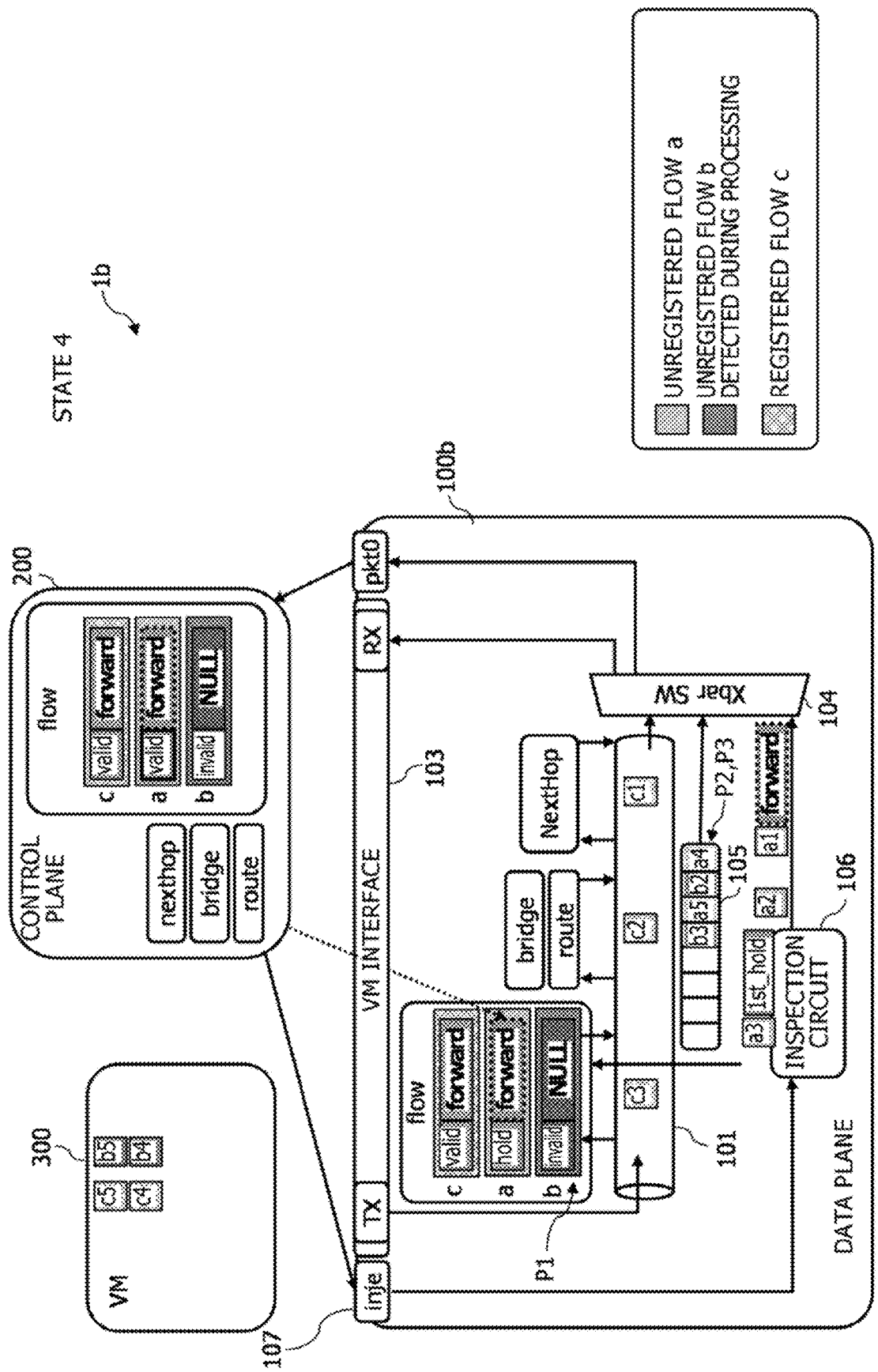
FIG. 22 is a diagram exemplarily illustrating the transition in the processing in the virtual router as an example of the second embodiment.
Figure 23:
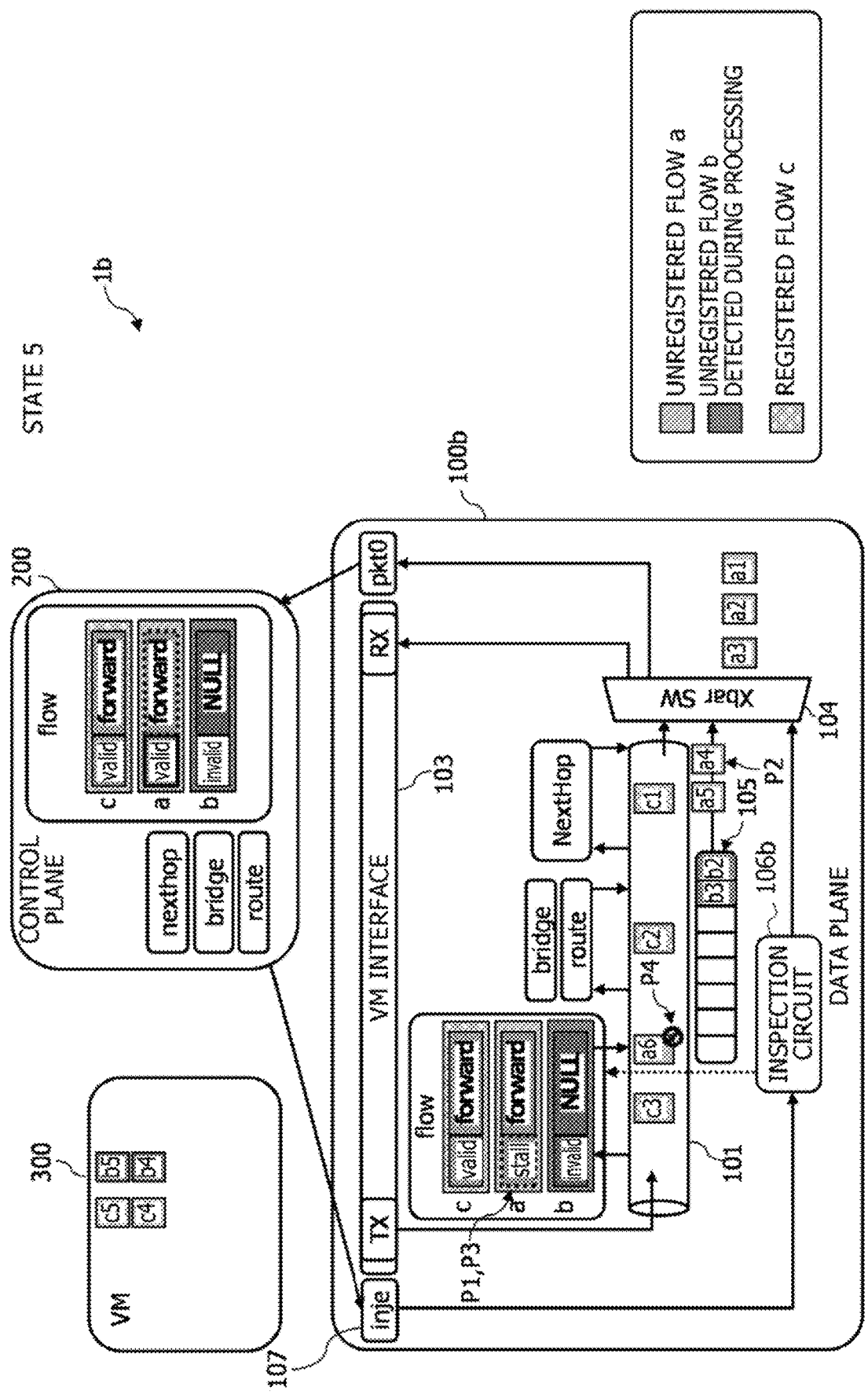
FIG. 23 is a diagram exemplarily illustrating the transition in the processing in the virtual router as an example of the second embodiment.

The pipeline 101 sets hold for management information of the flow b in the flow table (see a reference sign P1 in FIG. 22). Furthermore, the pipeline 101 transfers the packet b1 for which the flow miss occurs to the control plane 200 (see a reference sign S20 in FIG. 16). In the control plane 200, a destination search for the flow b is started.

Furthermore, the virtual machine as the transmission source (transmission VM) 300 outputs the packet a4 to be transmitted to the virtual machine as the transmission destination (reception VM) 300, and this packet a4 is input to the pipeline 101 (a reference sign S22 in FIG. 16). The pipeline 101 refers to the flow table (a reference sign S23 in FIG. 16) and acquires that the flow a is hold (a reference sign S24 in FIG. 16).

The pipeline 101 registers the packet a4 in the evacuation buffer unit 105 (see a reference sign S25 in FIG. 16 and a reference sign P2 in FIG. 22).

Figure 17:
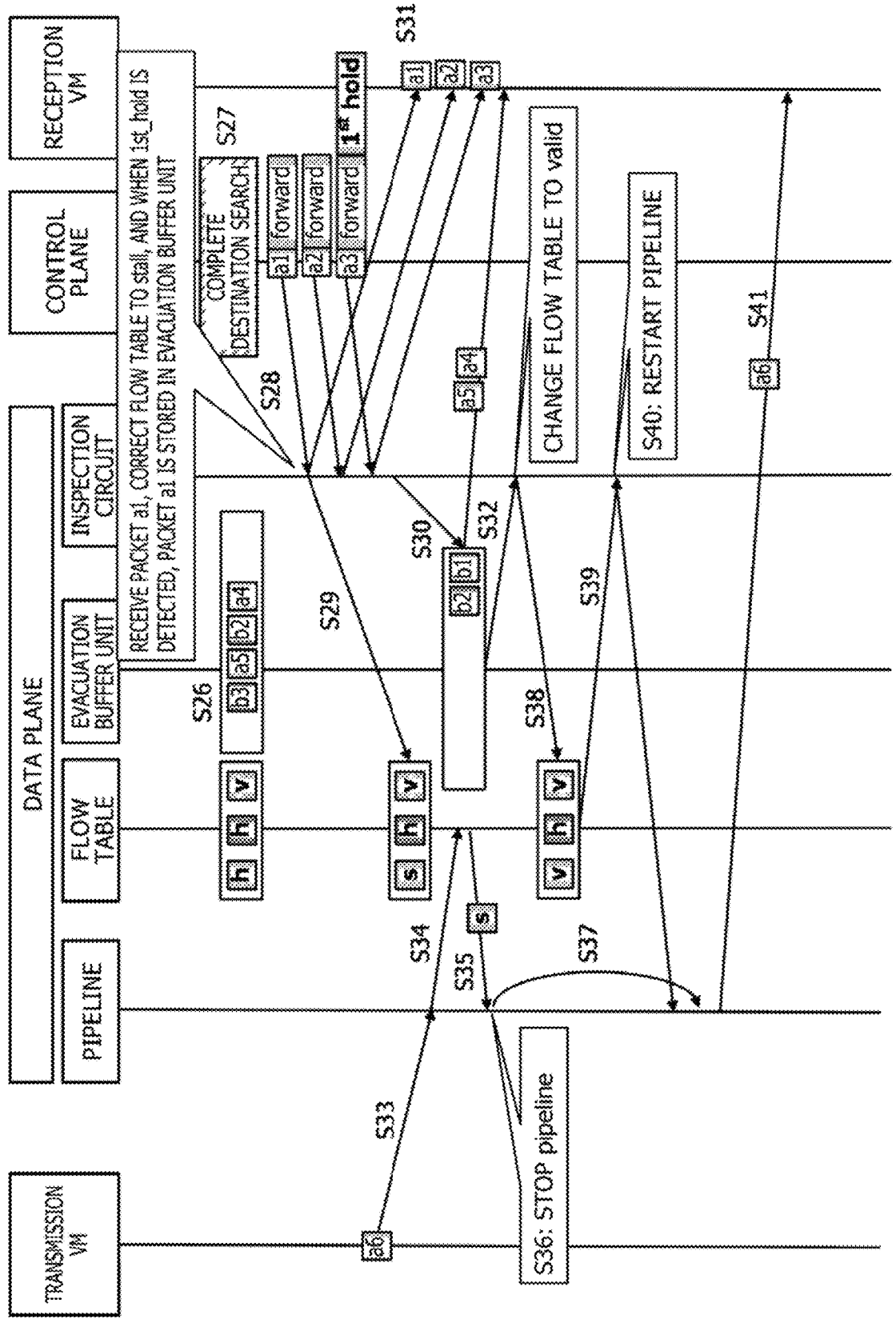
FIG. 17 is a timing chart for describing the processing in the virtual router as an example of the second embodiment.

Thereafter, in a similar manner, the packets b2 and a5 to be transmitted are output from the virtual machine as the transmission source (transmission VM) 300 to the virtual machine as the transmission destination (reception VM) 300, and these packets b2 and a5 are registered in the evacuation buffer unit 105 (see a reference sign S26 in FIG. 17 and a reference sign P3 in FIG. 22).

Here, when the destination search is completed in the control plane 200 (a reference sign S27 in FIG. 17), the control plane 200 attaches forward to the packet a1 and transfers the packet a1 to the reintroduction port 107.

The packet a1 (to which forward is attached) input to the reintroduction port 107 is input to the inspection circuit 106a (see a reference sign S28 in FIG. 17 and a reference sign P3 in FIG. 21). The inspection circuit 106a registers (sets) stall for the flow a of the corresponding packet a1 in the flow table (see a reference sign S29 in FIG. 17 and a reference sign P1 in FIG. 23).

The inspection circuit 106a acquires destination information from the packet a1 to which forward is attached, and adds the destination information to each of the packets (a1 to a5) belonging to the corresponding flow (flow a in this example) stored in the evacuation buffer unit 105 (see a reference sign S30 in FIG. 17). In the inspection circuit 106a, the 1st_hold inspection circuit 1066 outputs each of the packets a1 to a5 belonging to the same flow as the packet a1 among a plurality of packets stored in the evacuation buffer unit 105 (see a reference sign S31 in FIG. 17 and a reference sign P2 in FIG. 23). The crossbar switch 104 transmits these packets output from the evacuation buffer unit 105 to the virtual machine as the transmission destination (reception VM) 300.

The switching determination unit 1056 of the evacuation buffer unit 105 inputs, to the 1st_hold inspection circuit 1066, an output completion report indicating that all the packets a1 to a5 belonging to the flow a are output from the FIFO buffer 1052 (see a reference sign S32 in FIG. 17).

Furthermore, here, the virtual machine as the transmission source (transmission VM) 300 outputs a packet a6 to be transmitted to the virtual machine as the transmission destination (reception VM) 300, and this packet a6 is input to the pipeline 101 (a reference sign S33 in FIG. 17). The pipeline 101 refers to the flow table (a reference sign S34 in FIG. 17) and acquires that the flow a is stall (see a reference sign S35 in FIG. 17 and a reference sign P3 in FIG. 23). With this configuration, the pipeline 101 stops the corresponding pipeline 101 (see a reference sign S36 in FIG. 6 and a reference sign P4 in FIG. 23). With this configuration, the packet a6 is held on the pipeline 101 (see a reference sign S37 in FIG. 17).

Figure 24:
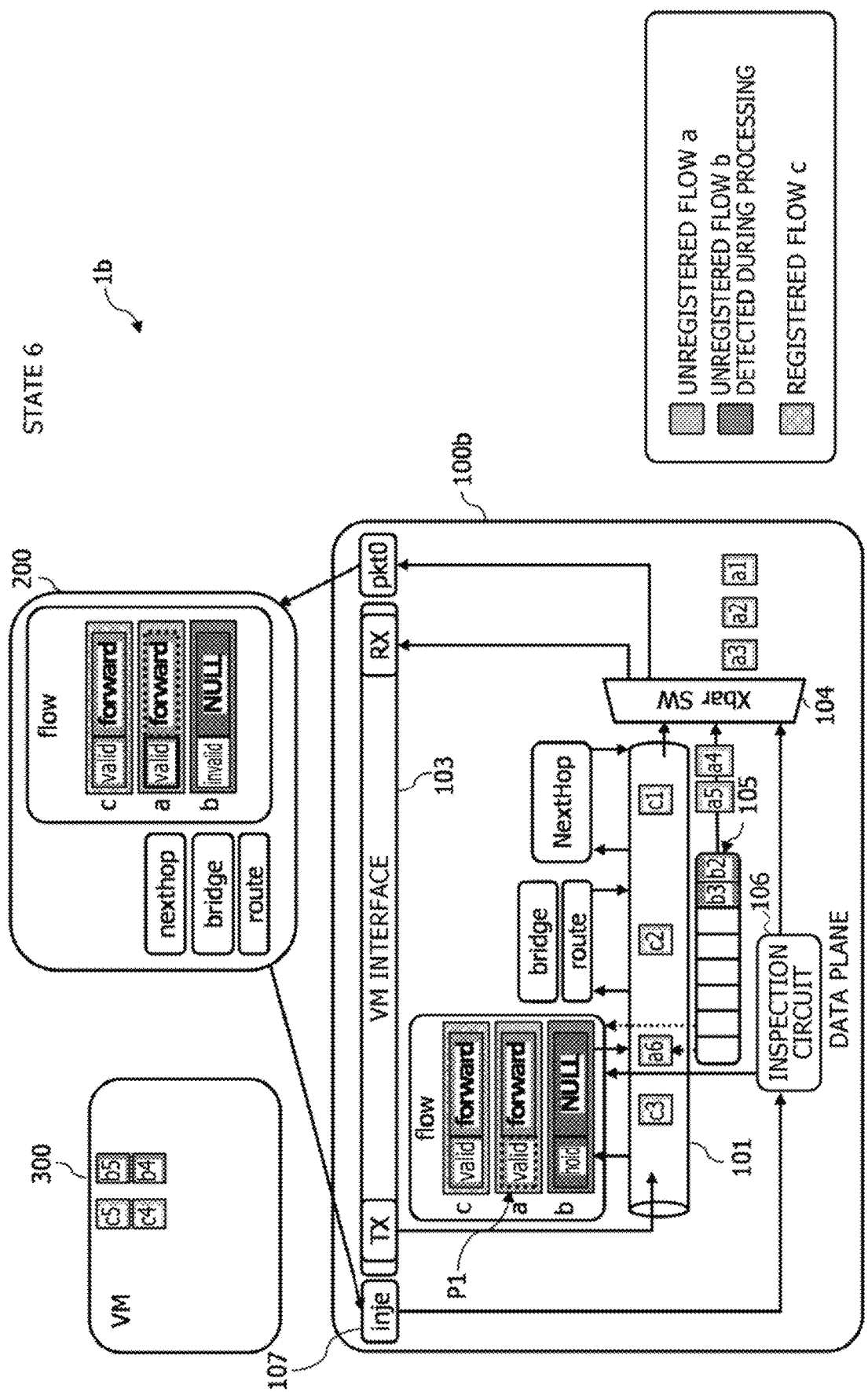
FIG. 24 is a diagram exemplarily illustrating the transition in the processing in the virtual router as an example of the second embodiment.

On the other hand, in the inspection circuit 106a in which the output completion report is input from the switching determination unit 1056, the valid write control unit 1064 registers (sets) valid for the flow (flow to be processed) a in the flow table (see a reference sign S38 in FIG. 17 and a reference sign P1 in FIG. 24). Furthermore, the valid write control unit 1064 inputs a notification that the output of the flow to be processed is completed to a restart instruction unit 1065.

When valid is set for the flow in the flow table (a reference sign S39 in FIG. 17), the restart instruction unit 1065 causes the pipeline 101 to restart (a reference sign S40 in FIG. 17). With this configuration, the packet a6 held on the pipeline 101 is output and transmitted to the virtual machine as the transmission destination (reception VM) 300 (a reference sign S41 in FIG. 17).

In the virtual machine as the transmission destination (reception VM) 300, the packets a1 to a5 of the flow a are received in a correct order.

Next, processing of the pipeline 101 in the virtual router 1b as an example of the second embodiment configured as described above will be described with reference to a flowchart (Steps A1 to A8 and A10 to A16) illustrated in FIG. 25.

Figure 25:
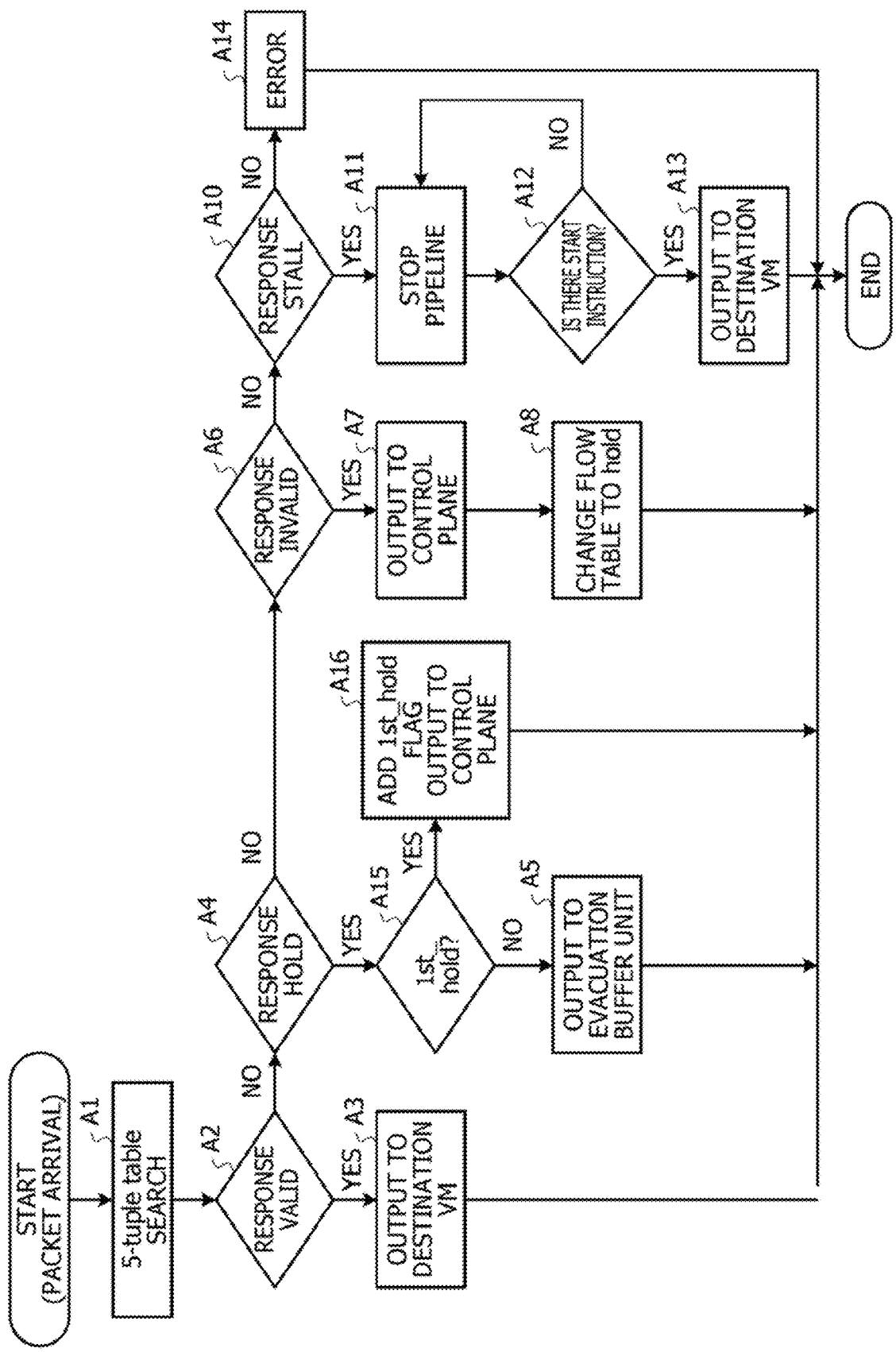
FIG. 25 is a flowchart for describing processing of a pipeline in the virtual router as an example of the second embodiment.
Figure 26:
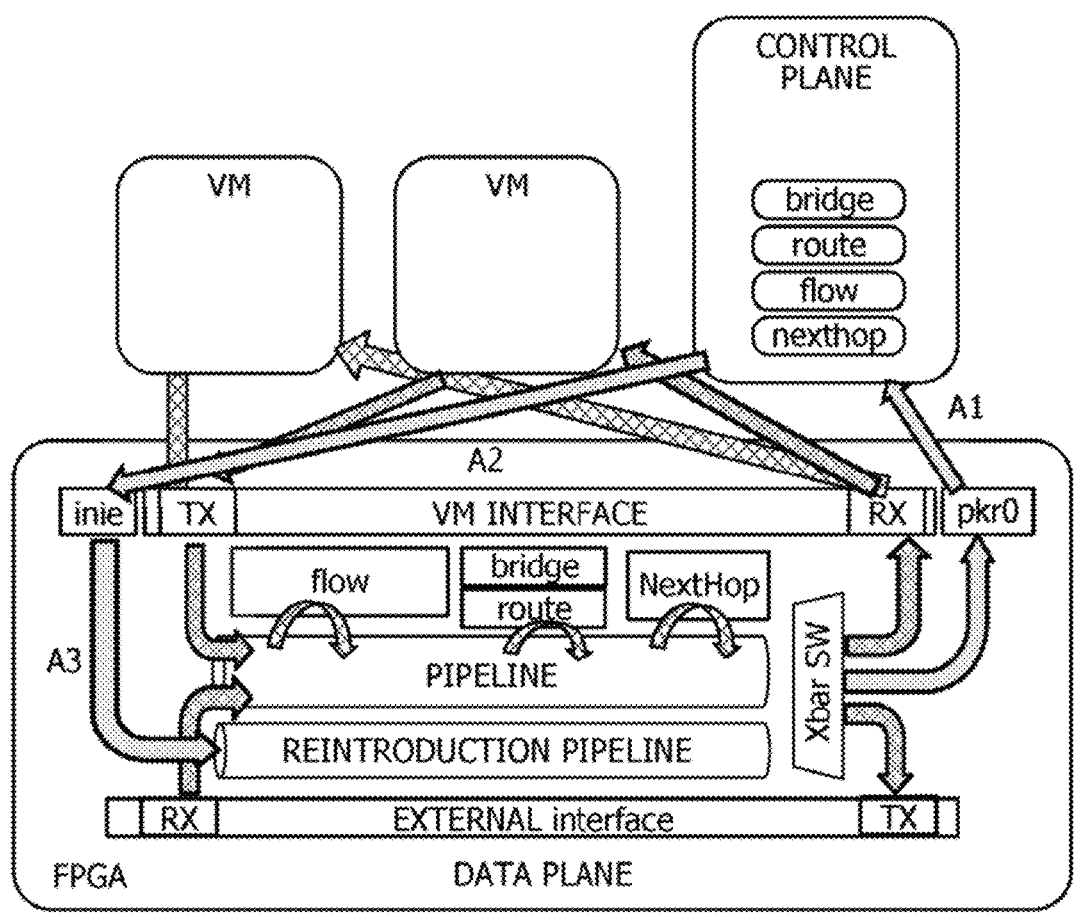
FIG. 26 is a diagram exemplarily illustrating a structure of a known virtual router.

The processing illustrated in FIG. 25 is started when a packet output from the virtual machine 300 arrives at the pipeline 101.

In Step A1, the pipeline 101 searches the flow table by using a hash value calculated on the basis of the 5-tuple of the input packets.

In Step A2, the pipeline 101 confirms whether a response from the flow table is valid. As a result of this confirmation, when the response from the flow table is valid (see YES route in Step A2), in Step A3, the pipeline 101 outputs the corresponding packet to the destination virtual machine 300 obtained by referring to the flow table. Thereafter, the processing ends.

As a result of the confirmation in Step A2, when the response from the flow table is not valid (see NO route in Step A2), the processing proceeds to Step A4. In Step A4, the pipeline 101 confirms whether the response from the flow table is hold. As a result of the confirmation, when the response from the flow table is hold (see YES route in Step A4), the processing proceeds to Step A15.

In Step A15, the pipeline 101 confirms whether the corresponding packet is a packet that is first detected as a packet to which hold is added. As a result of the confirmation, when the corresponding packet is the packet that is first detected as a packet to which hold is added (see YES route in Step A15), the processing proceeds to Step A16.

In Step A16, the 1st_hold setting unit 1011 adds the 1st_hold flag to the corresponding packet. Thereafter, the pipeline 101 outputs the packet for which the 1st_hold flag is added to the control plane 200, and the processing ends.

Furthermore, as a result of the confirmation in Step A15, when the corresponding packet is not the packet that is first detect as a packet to which hold is added (see NO route in Step A15), the processing proceeds to Step A5. In Step A5, the pipeline 101 outputs the corresponding packet to the evacuation buffer unit 105. Thereafter, the processing ends.

Furthermore, as a result of the confirmation in Step A4, when the response from the flow table is not hold (see NO route in Step A4), the processing proceeds to Step A6. In Step A6, the pipeline 101 confirms whether the response from the flow table is invalid. As a result of this confirmation, when the response from the flow table is invalid (see YES route in Step A6), in Step A7, the pipeline 101 outputs the corresponding packet to the control plane 200.

In Step A8, the pipeline 101 changes management information of a flow to which the corresponding packet belongs in the flow table to hold, and thereafter, the processing ends.

As a result of the confirmation in Step A6, when the response from the flow table is not invalid (see NO route in Step A6), the processing proceeds to Step A10. In Step A10, the pipeline 101 confirms whether the response from the flow table is stall. As a result of this confirmation, when the response from the flow table is stall (see YES route in Step A10), in Step A11, the corresponding pipeline 101 stops the pipeline 101.

In Step A12, the pipeline 101 confirms whether a start instruction of the pipeline 101 has been input. When the start instruction of the pipeline 101 has not been input (see NO route in Step A12), the processing returns to Step A11 to continue stopping the pipeline 101.

When the start instruction of the pipeline 101 is input (see YES route in Step A12), in Step A13, the pipeline 101 outputs the corresponding packet to the destination virtual machine 300 obtained by referring to the flow table. Thereafter, the processing ends.

As a result of the confirmation in Step A10, when the response from the flow table is not stall (see NO route in Step A10), the processing proceeds to Step A14. In Step A14, the pipeline 101 performs predetermined processing when an error occurs, such as outputting an error message. Thereafter, the processing ends.

(C) Effects

In this way, according to the virtual router 1b as an example of the second embodiment, similar operation and effect as those of the first embodiment described above may be obtained, and the number of packets to be stored in the evacuation buffer unit 105 may be reduced. With this configuration, an amount of the FIFO buffer 1052 used in the evacuation buffer unit 105 may be reduced, occurrence of buffer overflow in the FIFO buffer 1052 may be suppressed, and stable system operation may be implemented.

For example, in the virtual router 1b of this second embodiment, the 1st_hold packet is not stored in the evacuation buffer unit 105 but is transferred to the control plane 200. Furthermore, in the examples illustrated in FIGS. 18 to 24, the packets a1 to a3 are not stored in the evacuation buffer unit 105 but is transferred to the control plane 200. Furthermore, the packet for which invalid is set in the flow table is only transferred to the control plane 200 and is not stored in the evacuation buffer unit 105. With these configurations, the amount of the FIFO buffer 1052 used in the evacuation buffer unit 105 may be reduced.

(III) Others

Each configuration and each processing of each embodiment may be selected or omitted as needed or may also be appropriately combined.

Then, the disclosed technology is not limited to the embodiments described above, and various modifications may be made and implemented without departing from the spirit of the present embodiments.

For example, in the embodiments described above, the evacuation buffer unit 105 includes two FIFO buffers 1052-1 and 1052-2, and accordingly includes two output control switches 1053 and two comparators 1054, but the embodiments are not limited thereto. Three or more FIFO buffers 1052, three or more output control switches 1053, and three or more comparators 1054 may also be included, and appropriate modifications may be made and implemented.

Furthermore, the present embodiments may be implemented and manufactured by those skilled in the art according to the disclosure described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control apparatus for implementing flow control of a software defined network (SDN), the communication control apparatus comprising:
   a memory; and
   a processor coupled to the memory and configured to:
   set, when a packet of a flow that is not registered in transfer control information is detected when a plurality of packets that constitutes a flow is transferred, a destination resolution standby state for the flow in the transfer control information,
   store, into an evaluation queue, at least some of packets of the flow received when the flow is in the destination resolution standby state,
   stop, after destination resolution for the flow, a pipeline that processes a packet to be transferred,
   output, after the destination resolution for the flow, any packets that belong to the flow and are stored in the evacuation queue,
   set, after the output of any packets that belong to the flow and are stored in the evacuation queue is completed, a valid state for the flow in the transfer control information, and
   operate the pipeline after the output of any packets that belong to the flow and are stored in the evacuation queue is completed.

2. The communication control apparatus according to claim 1, wherein the processor set control information that stops the pipeline for the transfer control information.

3. The communication control apparatus according to claim 1, wherein the evacuation queue includes:

a plurality of First In, First Out (FIFO) buffers, and the processor compares a packet output from any of the FIFO buffers with output packet specification information and outputs the output packet from the corresponding evacuation queue when the output packet matches the output packet specification information.

4. The communication control apparatus according to claim 1, wherein the processor detects a first packet detected first as a packet for which a destination resolution standby state is set among packets input to the pipeline, and the evacuation queue stores a packet that follows the first corresponding packet and belongs to the same flow as the first packet.

5. A communication control system comprising:

a communication apparatus for implementing flow control of a software defined network (SDN), wherein the communication control apparatus includes:

a memory; and a processor coupled to the memory and configured to:

set, when a packet of a flow that is not registered in transfer control information is detected when a plurality of packets that constitutes a flow is transferred, a destination resolution standby state for the flow in the transfer control information, store, into an evacuation queue, at least some of packets of the flow received when the flow is in the destination resolution standby state, stop, after destination resolution for the flow, a pipeline that processes a packet to be transferred, output, after the destination resolution for the flow, any packets that belong to the flow and are stored in the evacuation queue, set, after the output of any packets that belong to the flow and are stored in the evacuation queue is completed, a valid state for the flow in the transfer control information, and operate the pipeline after the output of any packets that belong to the flow and are stored in the evacuation queue is completed.

6. The communication control apparatus according to claim 5, wherein the processor sets control information that stops the pipeline for the transfer control information.

7. The communication control system according to claim 5, wherein the evacuation queue includes:

a plurality of First In, First Out (FIFO) buffers, and the processor compares a packet output from any of the FIFO buffers with output packet specification information and outputs the output packet from the corresponding evacuation queue when the output packet matches the output packet specification information.

8. The c communication control system according to claim 5, wherein the processor detects a first packet detected first as a packet for which a destination resolution standby state is set among packets input to the pipeline, and the evacuation queue stores a packet that follows the first corresponding packet and belongs to the same flow as the first packet.

9. A communication control method executed by a communication control apparatus for implementing flow control of a software defined network (SDN), the communication control method comprising:

setting, when a packet of a flow that is not registered in transfer control information is detected when a plurality of packets that constitutes a flow is transferred, a destination resolution standby state for the flow in the transfer control information;

storing, into an evacuation queue, at least some of packets of the flow received when the flow is in the destination resolution standby state;

stopping, after destination resolution for the flow, a pipeline that processes a packet to be transferred;

outputting, after the destination resolution for the flow, any packets that belong to the flow and are stored in the evacuation queue;

setting, after the output of any packets that belong to the flow and are stored in the evacuation queue is completed, a valid state for the flow in the transfer control information; and operating the pipeline after the output of any packets that belong to the flow and are stored in the evacuation queue is completed.

10. The communication control method according to claim 9, further comprising setting control information that stops the pipeline for the transfer control information.

11. The communication control method according to claim 9, further comprising comparing a packet output from any of a plurality of First In, First Out (FIFO) buffers included in the evacuation queue with output packet specification information and outputs the output packet from the corresponding evacuation queue when the output packet matches the output packet specification information.

12. The communication control method according to claim 9, further comprising detecting a first packet detected first as a packet for which a destination resolution standby state is set among packets input to the pipeline, wherein the evacuation queue stores a packet that follows the first corresponding packet and belongs to the same flow as the first packet.

* * * * *